United States Patent [19]
Hiraga

[11] Patent Number: 5,719,849
[45] Date of Patent: Feb. 17, 1998

[54] OPTICAL DISK HOLDING APPARATUS

[75] Inventor: Takayoshi Hiraga, Yokosuka, Japan

[73] Assignee: Kabushiki Kaisha Kenwood, Tokyo, Japan

[21] Appl. No.: 684,984

[22] Filed: Jul. 22, 1996

Related U.S. Application Data

[63] Continuation of Ser. No. 258,972, Jun. 13, 1994, abandoned.

[30] Foreign Application Priority Data

Jun. 14, 1993 [JP] Japan .................... 5-167520
Oct. 22, 1993 [JP] Japan .................... 5-287792

[51] Int. Cl.$^6$ ........................................ G11B 7/24
[52] U.S. Cl. .................................................. 369/271
[58] Field of Search ................................ 369/271, 270, 369/282, 75.2; 360/99.08, 99.12

[56] References Cited

U.S. PATENT DOCUMENTS

| 4,541,086 | 9/1985 | Tanaka | 369/271 |
|---|---|---|---|
| 4,786,997 | 11/1988 | Funabashi et al. | 369/271 |
| 4,853,924 | 8/1989 | Takahashi et al. | 369/270 |
| 4,855,990 | 8/1989 | Akiyama | 369/265 |
| 5,241,530 | 8/1993 | Kobayashi et al. | 369/271 |

FOREIGN PATENT DOCUMENTS

| 0287101 | 1/1988 | European Pat. Off. | |
| 3429096 | 7/1984 | Germany. | |
| 1182959 | 7/1989 | Japan | 369/271 |
| 2-96969 | 4/1990 | Japan | 369/271 |
| 2121151 | 5/1990 | Japan | 369/270 |
| 2121153 | 5/1990 | Japan | 369/270 |
| 2246043 | 10/1990 | Japan | 369/270 |

*Primary Examiner*—Stuart S. Levy
*Assistant Examiner*—Allen Cao
*Attorney, Agent, or Firm*—Sixbey, Friedman, Leedom & Ferguson; Gerald J. Ferguson, Jr.; Eric J. Robinson

[57] ABSTRACT

An optical disk holding apparatus suitable for holding either an optical disk of a first type, such as a compact disk, or an optical disk of a second type, such as a mini disk. The optical disk holding apparatus operates to hold each disk such that a distance between an optical pick-up and a first surface of the optical disk is the same when the apparatus is holding an optical disk of the first type or an optical disk of the second type. The optical disk holding apparatus includes a fixed unit mounted on a rotary shaft of a disk motor and a movable unit that is guided by the fixed unit and biased upward by a spring. A magnet is mounted on the upper surface of the fixed unit for attracting one of a clamper and a metal plate of a mini disk. When holding a disk of a first type, such as a compact disk, a tapered surface of the movable unit engages the center hole of the compact disk. The clamper is provided with a projection for alignment of the compact disk, and with a friction member which press-contacts the top surface of the compact disk. When holding a disk of a second type, such as a mini disk, a press contact plane at the upper surface of the movable unit contacts the central flange plane of the mini disk.

10 Claims, 20 Drawing Sheets

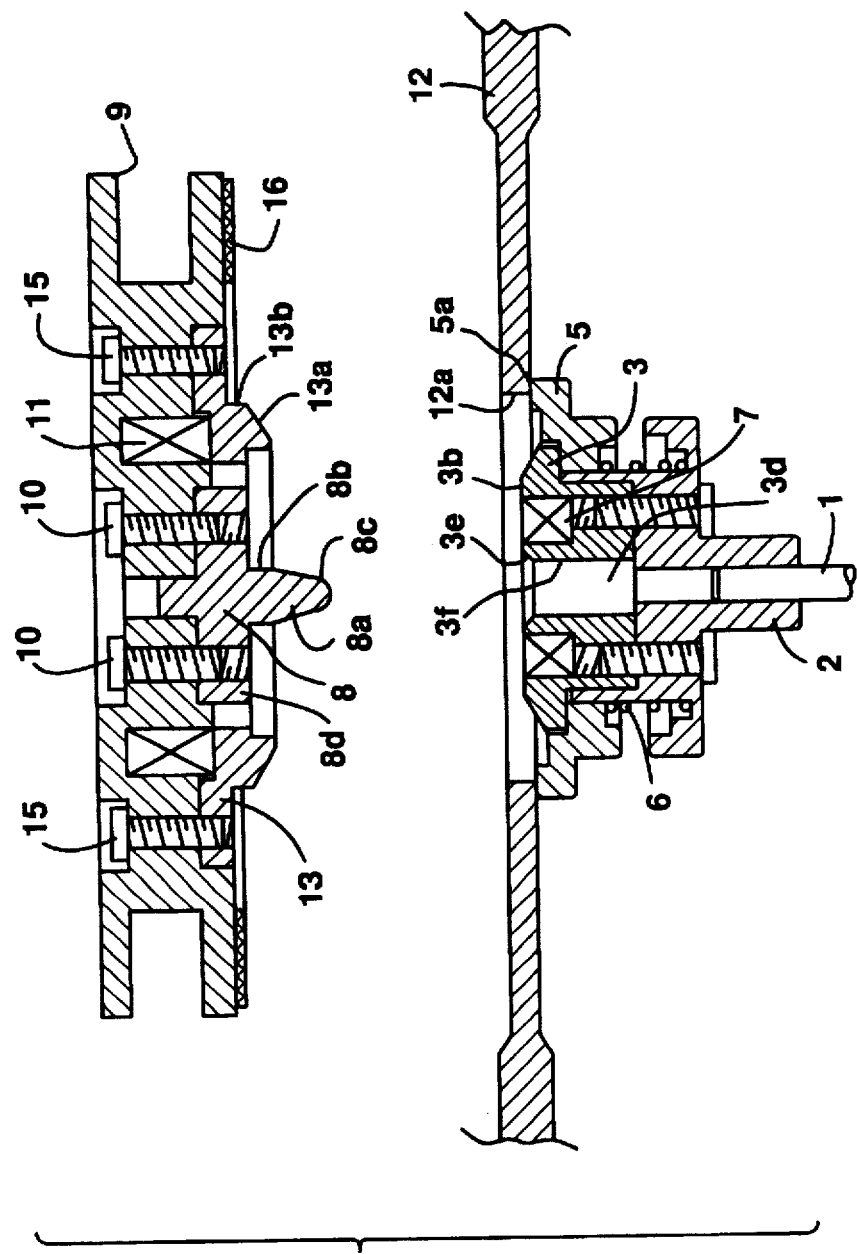

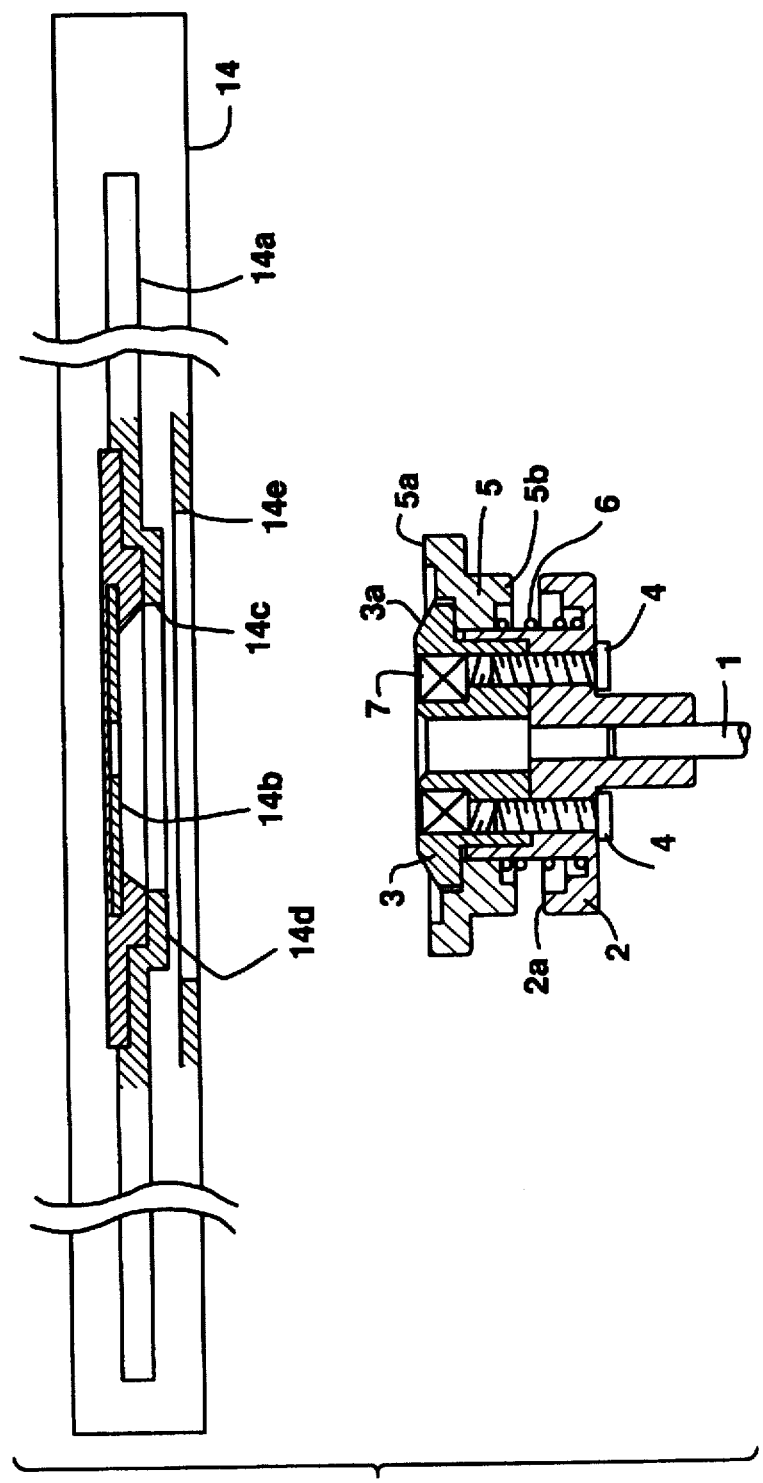

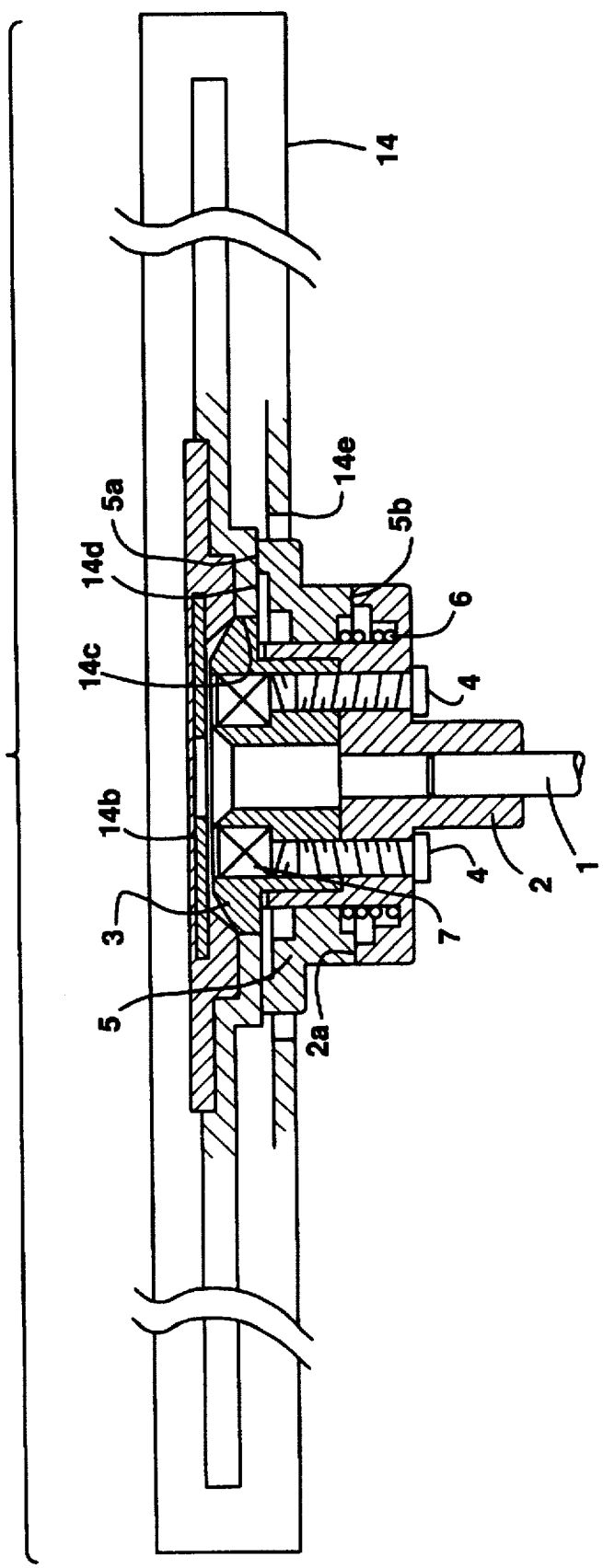

OPTICAL DISK HOLDING APPARATUS

This application is a Continuation of Ser. No. 08/258,972, filed Jun. 13, 1994, now abandoned.

BACKGROUND OF THE INVENTION

1. Field of the Invention

The present invention relates to an optical disk recording/reproducing apparatus, and more particularly to an optical disk holding apparatus for holding an optical disk while it is rotated.

2. Related Background Art

A so-called mini disk (hereinafter referred to as a MD) is known which is a rewritable optical disk, and a recording/reproducing apparatus dedicated to a MD is commercially available. A compact disk (hereinafter referred to as a CD) is also known which is a reproduction-only optical disk, and a reproducing apparatus dedicated to a CD is commercially available. A reproducing apparatus which can reproduce data from a CD and optical disks other than a MD such as a video disk is also commercially available.

The common point to both a CD and a MD is that a laser spot is applied from an optical pickup to a record track and a reflected beam is received by a light receiving element whose output is used for reproducing recorded data.

There are different points, however, between a CD and a MD as in the following. In the case of a MD, an optical disk is housed within a cartridge. The rotation and recording/reproducing of the optical disk are performed by using a hole and a shutter formed in the cartridge. A CD is not housed in a cartridge.

In the case of a MD, a disk is held on a turntable by attracting a metal plate mounted on the disk main body by a magnet mounted on the turntable. A CD is not provided with a metal plate, and is held on the turntable by holding it at both front and back surfaces.

Although a positioning hole is formed in both a CD and a MD at the central area thereof, the hole of a CD is larger than that of a MD. The hole of a CD is a through hole, and the hole of a MD is shielded at its upper opening by a metal plate.

As described above, the shapes and holding structures of a CD and a MD are different. Therefore, although there is the common point that data reproduction is performed by a reflected light beam of a laser spot, a reproducing apparatus has not been realized heretofore which is compatible with both a CD and a MD and capable of driving a CD and a MD by the same disk motor and reproducing data by the same optical pickup.

SUMMARY OF THE INVENTION

The present invention has been made under the above-described circumstances. It is an object of the present invention to provide an optical disk holding apparatus which can realize a compatible reproducing apparatus by holding a CD and a MD on the same turntable. A first optical disk holding apparatus of this invention includes:

a fixed unit fixed to a rotary shaft of a disk motor;

a movable unit being guided by the fixed unit and being movable up and down in a predetermined range; and a clamper adapted to move between a position where the clamper contacts the fixed unit and a position spaced upward from the fixed unit, wherein:

the fixed unit has an attracting member mounted on the upper surface thereof, the attracting member attracting an element constituting an optical disk or the clamper;

the clamper has a press contact plane at the lower surface thereof, the press contact plane press-contacting the upper surface of an optical disk without the element;

the movable unit has a taper surface at the upper periphery thereof, the taper surface being fitted in a center hole of the optical disk without the element and positioning the optical disk without the element, and the taper surface being fitted in the center hole by one of or both an elastic force of a spring and an attraction force of the attracting member relative to the clamper;

the movable unit has a press contact plane at the upper surface thereof, the press contact plane press-contacting a central flange plane of an optical disk with the element; and one of the fixed unit and the movable unit has a plane being fitted in a center hole of the optical disk with the element and positioning the optical disk with the element, and wherein a difference between a height at the press contact plane of the clamper holding the optical disk with the element and a height at the press contact plane of the movable unit holding the optical disk with the element is set to be equal to a sum of a difference of a height between the press contact plane and a record surface of the optical disk without the element and a difference of a height between the central flange plane and a record surface of the optical disk with the element.

In the first optical disk holding apparatus, one of or both the contact planes between the fixed unit and the clamper are formed to have a large friction coefficient or attached with a member having a large friction coefficient.

In the first optical disk holding apparatus, the press contact plane of the clamper press-contacting the upper surface of the optical disk without the element is attached with a member having a large friction coefficient.

In the first optical disk holding apparatus, one of or both the contact planes between the movable unit at a lower limit position and the fixed unit are formed to have a large friction coefficient or attached with a member having a large friction coefficient.

In the first optical disk apparatus other than the optical disk apparatus in which one of or both the contact planes between the movable unit and the fixed unit are formed to have a large friction coefficient or attached with a member having a large friction coefficient, a rotation-stop member is provided between the movable unit and the fixed unit.

A second optical disk holding apparatus of this invention includes:

a fixed unit fixed to a rotary shaft of a disk motor;

a movable unit being guided by the fixed unit and being movable up and down in a predetermined range; and a clamper adapted to move between a position where the clamper contacts the fixed unit or the movable unit and a position spaced upward from the fixed unit or the movable unit, wherein:

the fixed unit has retaining means mounted on the upper surface thereof, the retaining means retaining an element constituting a first optical disk;

the clamper has a first reference plane at the lower surface thereof, the first reference plane determining a height of the upper surface of a second optical disk without the element;

the clamper has a projection at the lower central area thereof, the projection being fitted in a center hole of the second optical disk and determining the radial position of the second optical disk;

the movable unit has a press plane at the upper peripheral surface thereof, the press plane pressing the second optical disk against the clamper by press-contacting the upper peripheral surface with the second optical disk by energizing means;

the movable unit has a second reference plane at the upper surface thereof, the second reference plane contacting a central flange plane of the first optical disk and determining a height of the first optical disk when the movable unit contacts a lower limit stopper of the fixed unit; and one of the fixed unit and the movable unit has a positioning plane being fitted in a center hole of the first optical disk and determining the position of the first optical disk, and wherein a difference between a height at the first reference plane holding the second optical disk and a height at the second reference plane holding the first optical disk is set to be equal to a sum of a difference of a height between the upper contact plane and a record surface of the second optical disk and a difference of a height between the central flange plane and a record surface of the first optical disk.

In the second optical disk holding apparatus, the energizing means of the movable unit is a coil spring disposed between the fixed unit and the movable unit, an attracting member mounted on the clamper for attracting the movable unit, or both the spring coil and the attracting member.

In the second optical disk holding apparatus, one of or both the contact planes between the fixed unit and the clamper are formed to have a large friction coefficient or attached with a member having a large friction coefficient.

In the second optical disk holding apparatus, the contact plane of the clamper press-contacting the upper surface of the second optical disk is attached with a member having a large friction coefficient.

In the second optical disk holding apparatus, one of or both the contact planes between the movable unit at a lower limit position and the fixed unit are formed to have a large friction coefficient or attached with a member having a large friction coefficient.

In the second optical disk holding apparatus, a rotation-stop member is provided between the movable unit and the fixed unit.

In the second optical disk holding apparatus, at least part of an engaging surfaces between the fixed unit and the clamper is formed by a cylindrical plane.

According to the first optical disk holding apparatus of this invention, when an optical disk having an element to be attracted, i.e., an MD, is loaded, the clamper is maintained above the fixed unit. The attracting member, such as a magnet, mounted on the fixed unit, attracts the element or metal plate of the MD and lowers the MD. As the MD is lowered, the central flange plane of the MD is pressed against the press contact plane of the movable unit at the lower limit position to thereby determine the vertical position.

As the MD lowers, the center hole of the MD is engaged with a positioning plane of one of the fixed unit and movable unit to thereby position the MD coaxially with the rotary shaft of a disk motor. The rotation force of the disk motor is transmitted to the MD with the help of a friction force between the fixed unit and movable unit and a friction force between the movable unit and MD central flange plane.

When an optical disk without the element to be attracted, i.e., a CD, is loaded, the clamper is moved down to the fixed unit and the attracting unit of the fixed unit attracts the element of the clamper.

As the movable unit is attracted by an attracting unit mounted on the clamper or by an elastic force of a spring, the taper plane of the movable unit is fitted in the center hole of the CD which is pressed against the press contact plane of the clamper, to thereby position the CD coaxially with the rotary shaft of the disk motor. The rotation force of the disk motor is transmitted to the CD with the help of a friction force between the fixed unit and the clamper and a friction force between the clamper press contact plane and the CD press contact plane.

The surface generating the friction force may be formed rough to have a large friction coefficient or a member having a large friction coefficient may be attached to the surface. In this case, the rotation force of the disk motor can be reliably transmitted to an optical disk.

A rotation-stop member may be provided between the movable unit and fixed unit to transmit the rotation force from the fixed unit to the movable unit without using a friction force.

As described above, according to the first optical disk holding apparatus of the invention, it is possible to align either CD or an MD relative to the rotary shaft of a disk motor and to drive it. A difference between a height at the press contact plane of the clamper holding CD and a height at the press contact plane of the movable unit holding an MD is set to be equal to a sum of a difference of a height between the press contact plane and a record surface of the CD and a difference of a height between the central flange plane and a record surface of the MD. Therefore, the record surfaces of the CD and MD are the same so that data can be reproduced both from the CD and MD without changing the height of an optical pickup.

According to the second optical disk holding apparatus of this invention, when an optical disk having an element to be attracted such as a magnetic metal plate, i.e., an MD, is loaded, the clamper is maintained above the fixed unit. The retaining means such as a magnet, mounted on the fixed unit, attracts the metal plate of the MD and lowers the MD. As the MD is lowered, the central flange plane of the MD is pressed against the press contact plane of the movable unit at the lower limit position to thereby determine the vertical position.

As the MD lowers, the center hole of the MD is engaged with a positioning plane of one of the fixed unit and movable unit to thereby position the MD coaxially with the rotary shaft of a disk motor. The rotation force of the disk motor is transmitted to the MD with the help of a friction force between the fixed unit and movable unit and a friction force between the movable unit and MD central flange plane.

When an optical disk without the element to be attracted, i.e., a CD, is loaded, the clamper is moved down to the fixed unit and the attracting unit of the fixed unit attracts the element of the clamper, or the clamper lift mechanism press the clamper against the fixed unit.

At this time, the clamper is engaged with the fixed unit or movable unit to thereby determine the lateral position of the clamper. If part of the engaging surface is formed by a cylindrical plane, it is possible to prevent a displacement of the clamper when an external force such as vibrations is applied thereto.

The energizing means energizes the movable unit upward, and the CD is pushed upward by the movable unit so that it engages with the projection of the clamper to thereby determine the radial position. The CD is pressed against the press contact plane of the clamper, and the rotation force of the disk motor is transmitted to the CD with the help of a friction force between the fixed unit and the clamper and a friction force between the clamper press contact plane and the CD press contact plane.

The surface generating the friction force may be formed rough to have a large friction coefficient or a member having a large friction coefficient may be attached to the surface. In this case, the rotation force of the disk motor can be reliably transmitted to an optical disk.

A rotation-stop member may be provided between the movable unit and fixed unit to transmit the rotation force from the fixed unit to the movable unit without using a friction force.

As described above, according to the second optical disk holding apparatus of the invention, it is possible to align either a CD or an MD relative to the rotary shaft of a disk motor and to drive it. A difference between a height at the upper press contact plane of the clamper holding a CD and a height at the press contact plane of the movable unit holding an MD is set to be equal to a sum of a difference of a height between the press contact plane and a record surface of the CD and a difference of a height between the central flange plane and a record surface of the MD. Therefore, the record surfaces of the CD and MD are the same so that data can be reproduced both from the CD and MD without changing the height of an optical pickup.

BRIEF DESCRIPTION OF THE DRAWINGS

FIG. 17 is a cross sectional view showing a CD loaded on the optical disk holding apparatus before the clamper is lowered.

FIG. 19 is a cross sectional view showing an MD loaded above the optical disk holding apparatus.

FIG. 20 is a cross sectional view showing an MD lowered from the position shown in FIG. 19 and held by the optical disk holding apparatus.

DETAILED DESCRIPTION OF THE PREFERRED EMBODIMENTS

Embodiments of First Optical Disk Holding Apparatus

Figure 1:
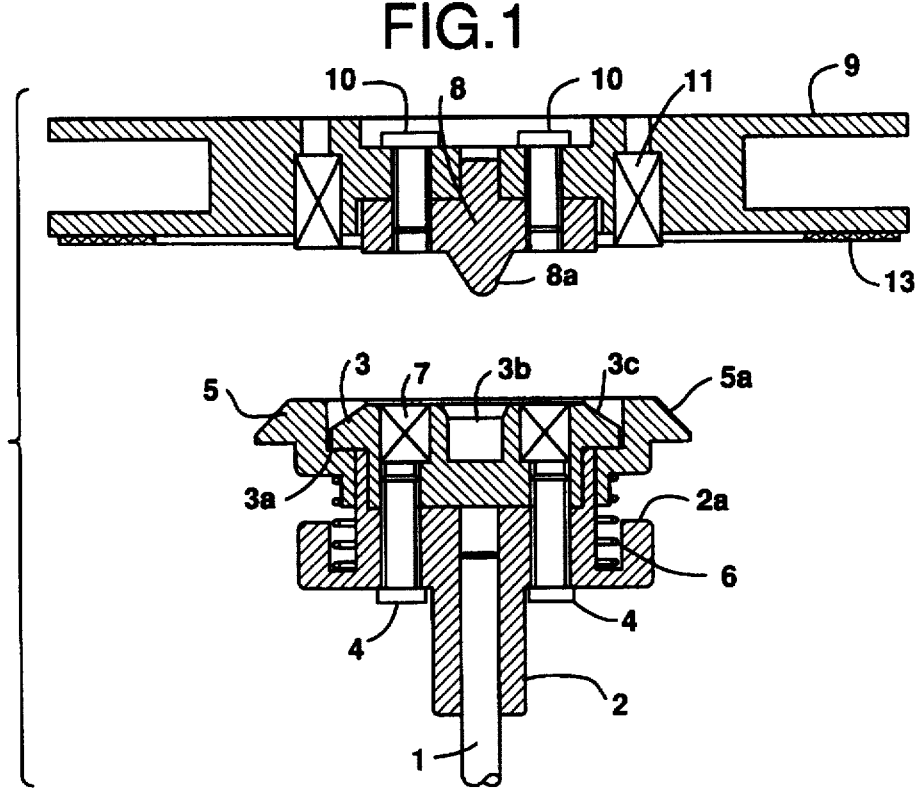
FIG. 1 is a cross sectional view of an optical disk holding apparatus according to an embodiment of the invention.

The embodiments of the invention will be described with reference to the accompanying drawings. FIG. 1 is a cross sectional view of a first optical disk holding apparatus according to an embodiment of the present invention. In FIG. 1, reference numeral 1 represents a rotary shaft of a disk motor fixed to a chassis. The rotary shaft 1 is press-fitted in a hole formed in a lower fixed unit 2, and that the rotary shaft 1 and lower fixed unit 2 are formed in one unit.

A compression coil spring 6 is disposed around the periphery of the lower fixed unit 2. A movable unit 5 is placed on one end of the sprint 6 and loosely engaged with the lower fixed unit 2. Under this condition, an upper fixed unit 3 is fixedly coupled to the lower fixed unit 2 by screws 4. The movable unit 5 is movable between a step plane 3a of the upper fixed unit 3 and a pressure contact plane 2a of the lower fixed unit 2. The movable unit 5 is normally pressed against the step plane 3a of the upper fixed unit 3 by the force of the compression coil spring 6 as shown in FIG. 1.

The upper periphery of the movable unit 5 is formed with a taper plane 5a. A ring magnet 7 is embedded in the upper fixed unit 3 at its upper area, and a positioning hole 3b is formed in the upper fixed unit at its central area. The upper periphery of the upper fixed unit 3 is formed with a taper plane 3c.

Figure 3A:
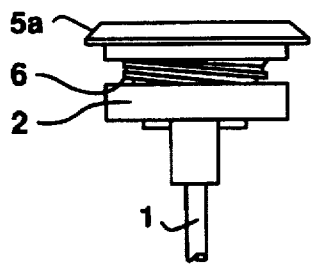
FIG. 3(a) is a front view showing the main part of the optical disk holding apparatus.
Figure 3B:
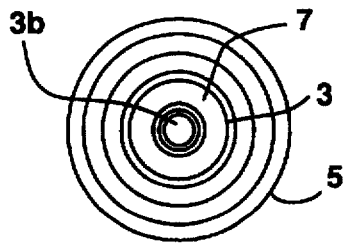
FIG. 3(b) is a plan view of the main part.
Figure 3C:
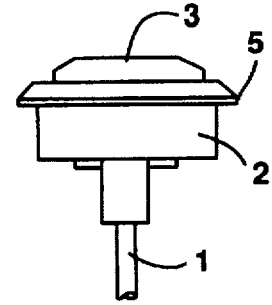
FIG. 3(c) is a front view showing a movable unit of the main part at a lower limit position.

FIG. 3 shows an outer appearance of an assembly state of the lower fixed unit 2, movable unit 5, and upper fixed unit 3. FIG. 3(a) shows a state where the movable unit 5 is at its upper limit, and FIG. 3(b) shows a state where the movable unit 5 is at its lower limit.

A clamper is constituted by a clamper main body 9 and an attaching unit 8 fixed to the main body 9 by screws. The clamper is driven by a drive mechanism (not shown) and moved between the position shown in FIG. 1 and the position where a projection 8a of the attaching unit 8 is fitted in the hole 3b of the upper fixed member 3 when the attaching unit 8 is attracted by the magnet 7.

Figure 2A:
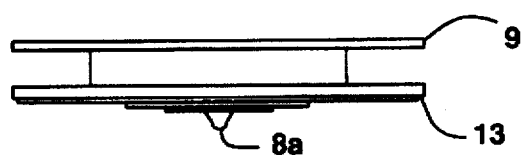
FIG. 2(a) is a front view of a clamper of the optical disk holding apparatus.
Figure 2B:
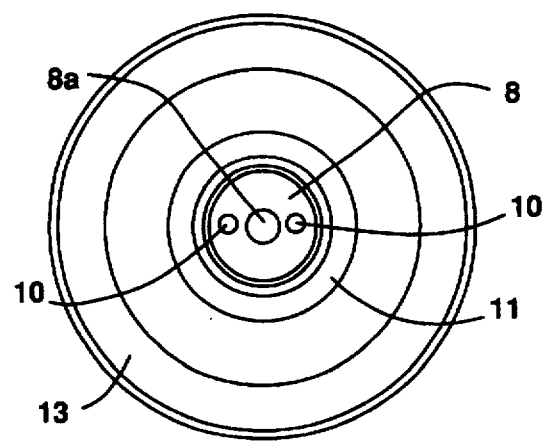
FIG. 2(b) is a bottom view of the clamper.

A ring magnet 11 for attracting the movable unit 5 is embedded in the clamper main body 9 at its lower areas. To the outer circumferential area of the clamper main body 9, a friction member 13 is attached for imparting a rotation force to a compact disk by tightly contacting the disk. FIG. 2 shows an outer appearance of the clamper.

Figure 4A:
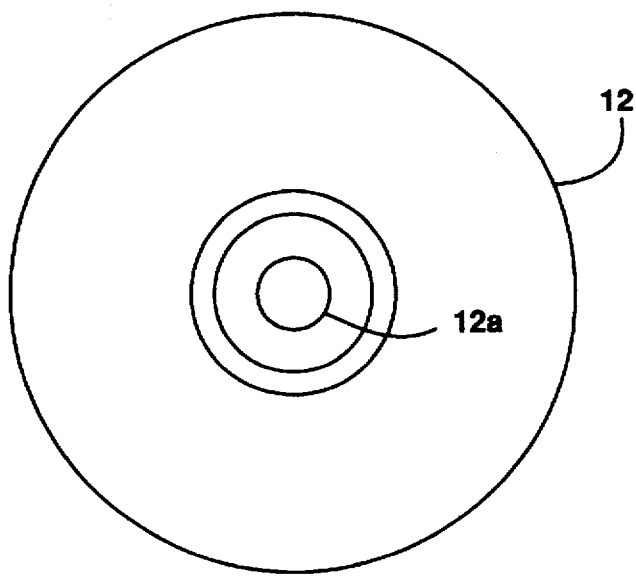
FIG. 4(a) is a plan view showing a CD held by the optical disk holding apparatus.
Figure 4B:
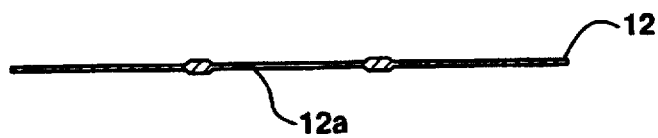
FIG. 4(b) is a cross sectional view of a CD.
Figure 5:
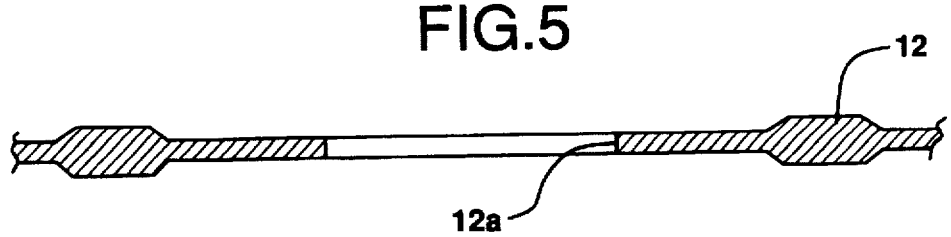
FIG. 5 is an enlarged view in section showing the central area of a CD.
Figure 6A:
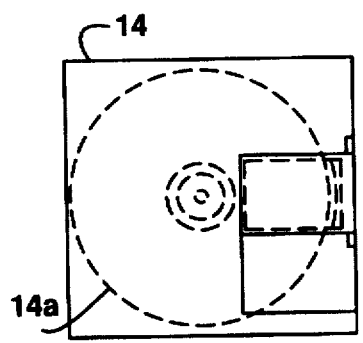
FIG. 6(a) is a plan view showing an MD held by the optical disk holding apparatus.
Figure 6B:
FIG. 6(b), FIG. 6(c), and FIG. 6(d) are a bottom view, a side view, and a cross sectional view of the MD shown in FIG. 6(a).
Figure 6C:
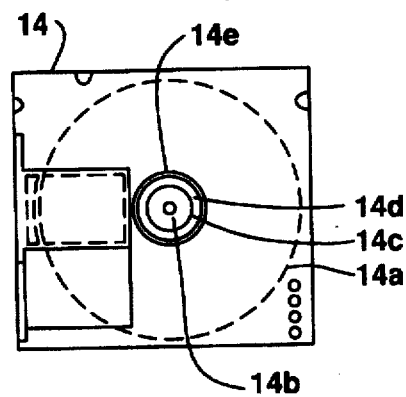
Figure 6D:
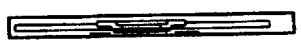

FIGS. 4 and 5 show a compact disk (CD) held by the optical disk holding apparatus. A center hole 12a is formed in a compact disk 12 at the center thereof.

Figure 7:
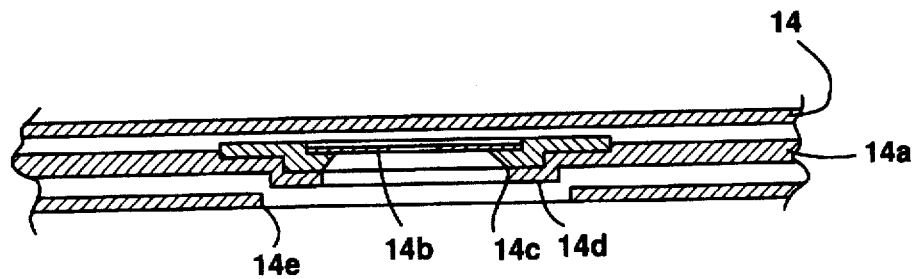
FIG. 7 is an enlarged view in section showing the central area of an MD.

FIGS. 6 and 7 show a mini disk (MD) held by the optical disk holding apparatus. A mini disk 14a is housed in a cartridge 14. The cartridge 14 has a hole 14e by which the mini disk 14a is held by the holding apparatus and a shutter used for passing a laser beam from an optical pickup and for pressing a magnetic head against the mini disk 14a.

At the central area of the mini disk, there are formed a center hole 14c for positioning the mini disk in the radial direction, and a flange 14d for positioning the mini disk in the height direction. A metal plate 14b for shielding the upper opening of the center hole 14c is also embedded at the central area of the mini disk.

Figure 8:
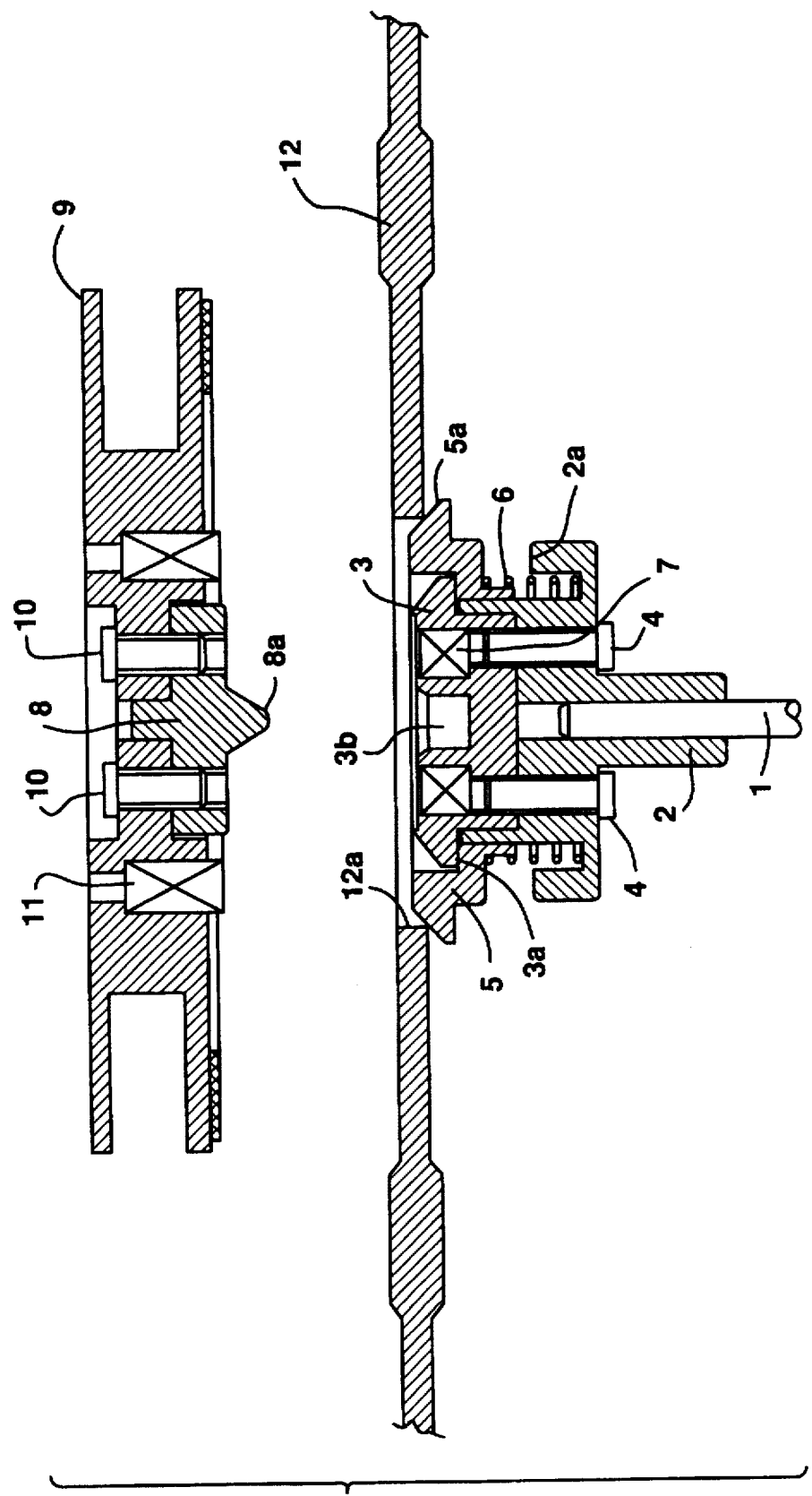
FIG. 8 is a cross sectional view showing a CD loaded on the optical disk holding apparatus before the clamper is lowered.

Next, with reference to FIGS. 8 and 9, how a compact disk is held by the holding apparatus will be described. First, the clamper main body 9 is maintained at the position shown in FIG. 8 just above the upper fixed unit 3, by the clamper drive mechanism.

Under this condition, the compact disk 12 is transported to the position above the upper fixed unit 3 by a loading mechanism, and thereafter it is lowered to the upper fixed unit 3 so that the edge of the center hole 12a of the compact disk 12 abuts the taper plane 5a of the movable unit 5. Because the elastic force of the compression coil spring 6 is set greater than the force of gravity of the movable unit 5 and compact disk 12, the movable unit 5 maintains pressed against the upper fixed unit 3.

Next, the clamper main body 9 is lowered by the clamper drive mechanism. As shown in FIG. 9, the attaching unit 8 is attracted by the magnet 7 so that the projection 8a enters the hole 3b and the clamper is positioned coaxially with the disk motor rotary shaft 1. Because the lower surface of the attaching unit 8 and the upper surface of the upper fixed unit 3 are vertical relative to their center axis, the lower surface of the attaching unit 8 becomes perpendicular to the central axis of the disk motor rotary shaft 1.

The lower surface of the clamper main body 9 is also perpendicular to the central axis of the disk motor rotary shaft 1. As a result, the friction member 13 attached to the clamper main body 9 pushes the compact disk 12 downward while maintaining the surface of the compact disk 12 perpendicular to the central axis of the disk motor rotary shaft 1. The compact disk 12 is therefore positioned coaxially with the disk motor rotary shaft 1 by the taper plane 5a of the movable unit 5.

Under this condition, the movable unit 5 receives the elastic force of the compression coil spring 6 and the attraction force of the magnet 11 so that it pushes the compact disk 12 against the friction member 13. In this manner, the compact disk is held in position, and the rotation force of the disk motor is transmitted to the compact disk with the help of the friction force between the upper fixed unit 3 and the press contact plane of the attaching unit 8 and the friction force between the friction member 13 and the compact disk 12.

Next, with reference to FIGS. 10 and 11, how a mini disk is held by the holding apparatus will be described. In this case, the clamper main body 9 is maintained at the upper position and is not shown in FIGS. 10 and 11.

Figure 10:
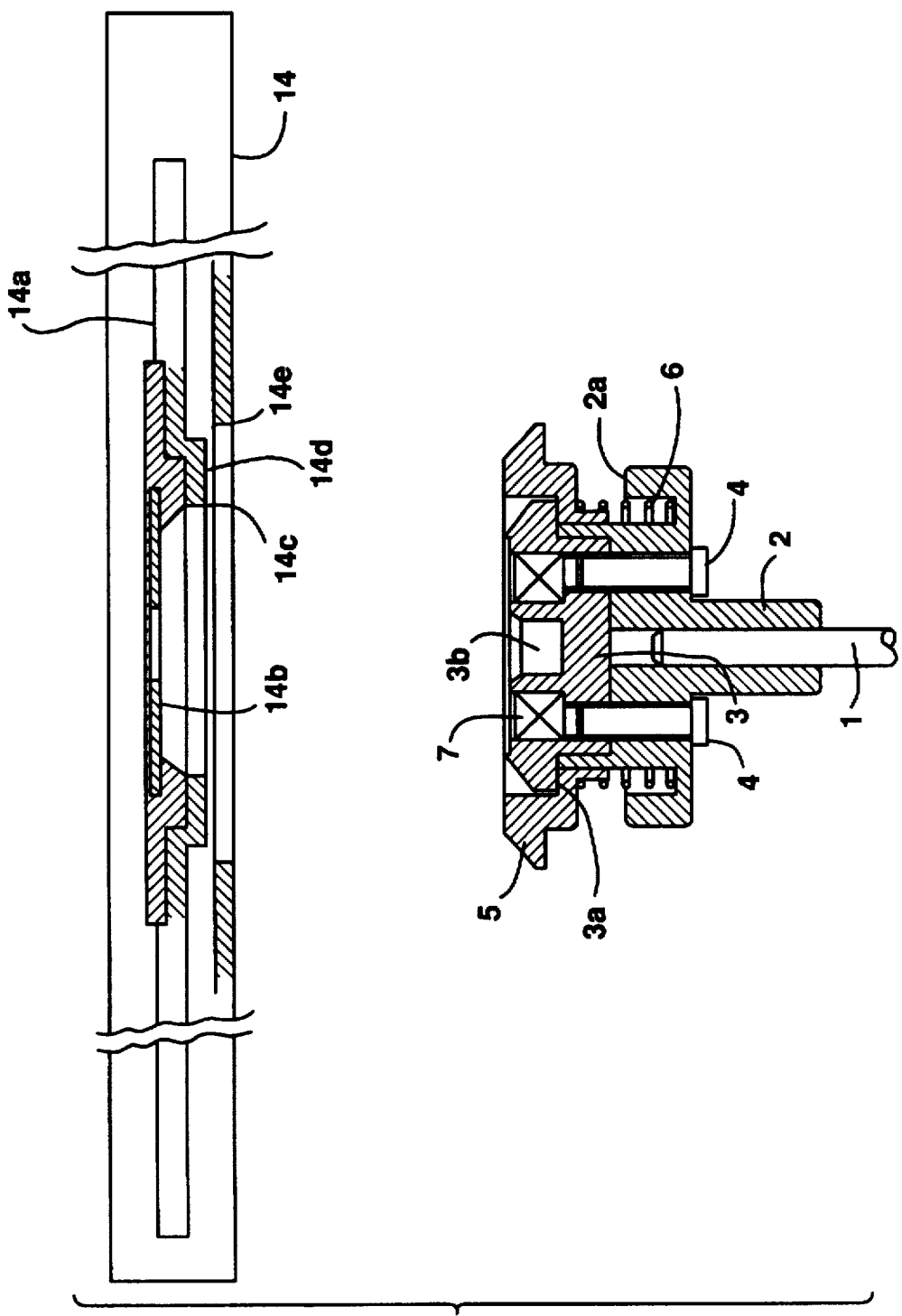
FIG. 10 is a cross sectional view showing an MD loaded above the optical disk holding apparatus.
Figure 11:
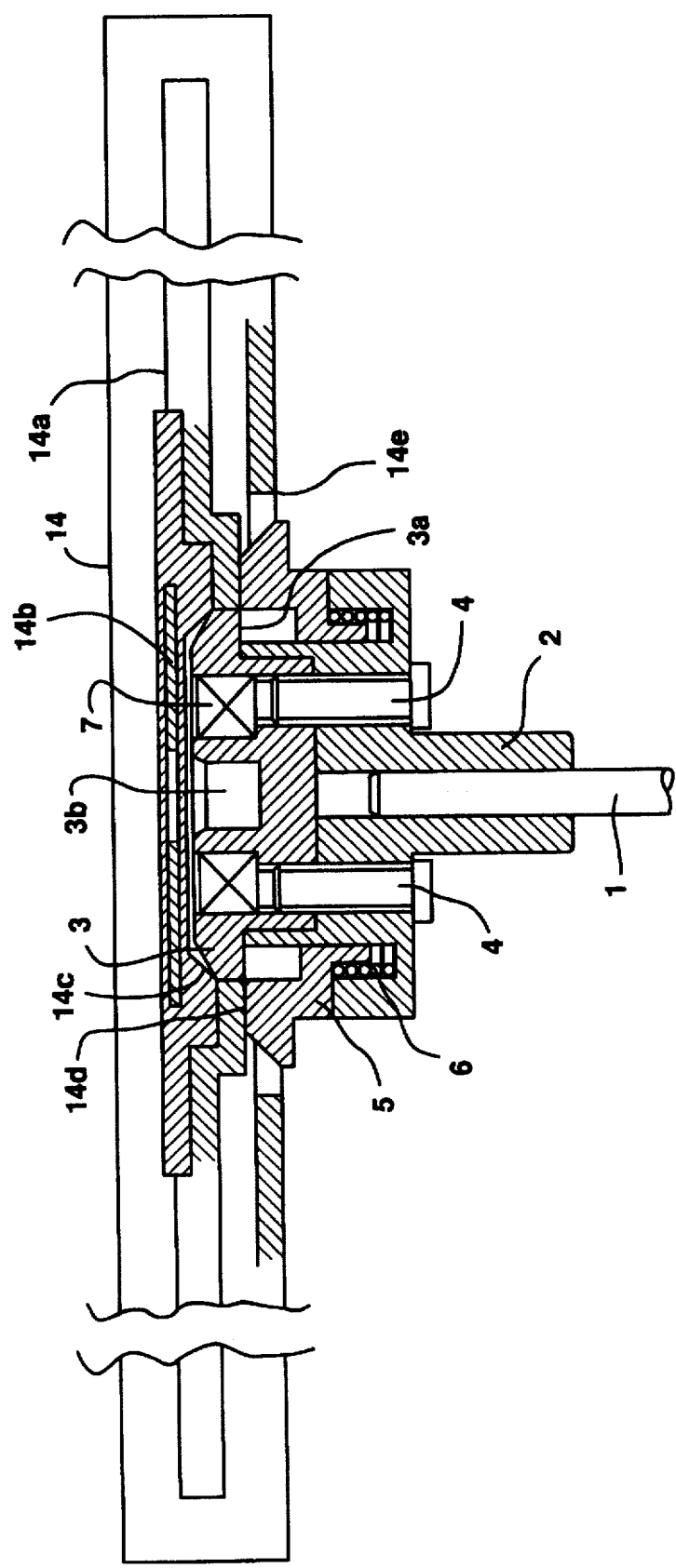
FIG. 11 is a cross sectional view showing an MD lowered from the position shown in FIG. 10 and held by the optical disk holding apparatus.

The cartridge 14 housing the mini disk 14a is transported to the position above the upper fixed unit 3 by the loading mechanism as shown in FIG. 10, and thereafter it is lowered and placed on the upper fixed unit 3 as shown in FIG. 11.

At this time, the metal plate 14b of the mini disk 14a is attracted by the magnet 7. The center hole 14c of the mini disk 14a is fitted around the upper fixed unit 3 so that the mini disk is positioned coaxially with the disk motor rotary shaft 1. The flange 14d of the mini disk 14a pushes the movable unit 5 down to its lower limit. Under this condition, the press contact plane 2a of the lower fixed unit 2 is pressed against the lower surface of the movable unit 5, and the upper surface of the movable unit 5 is pressed against the flange 14d of the mini disk 14a. As a result, the position of the mini disk 14a in the height direction is fixed, and the surface of the mini disk 14a is fixed perpendicular to the central axis of the disk motor rotary shaft 1.

In this manner, the mini disk is held in position, and the rotation force of the disk motor is transmitted to the mini disk 14a with the help of the friction force at the tight contact planes of the lower fixed unit 2 and the movable unit 5 and the friction force at the tight contact planes of the movable unit 5 and the flange 14d of the mini disk.

Figure 9:
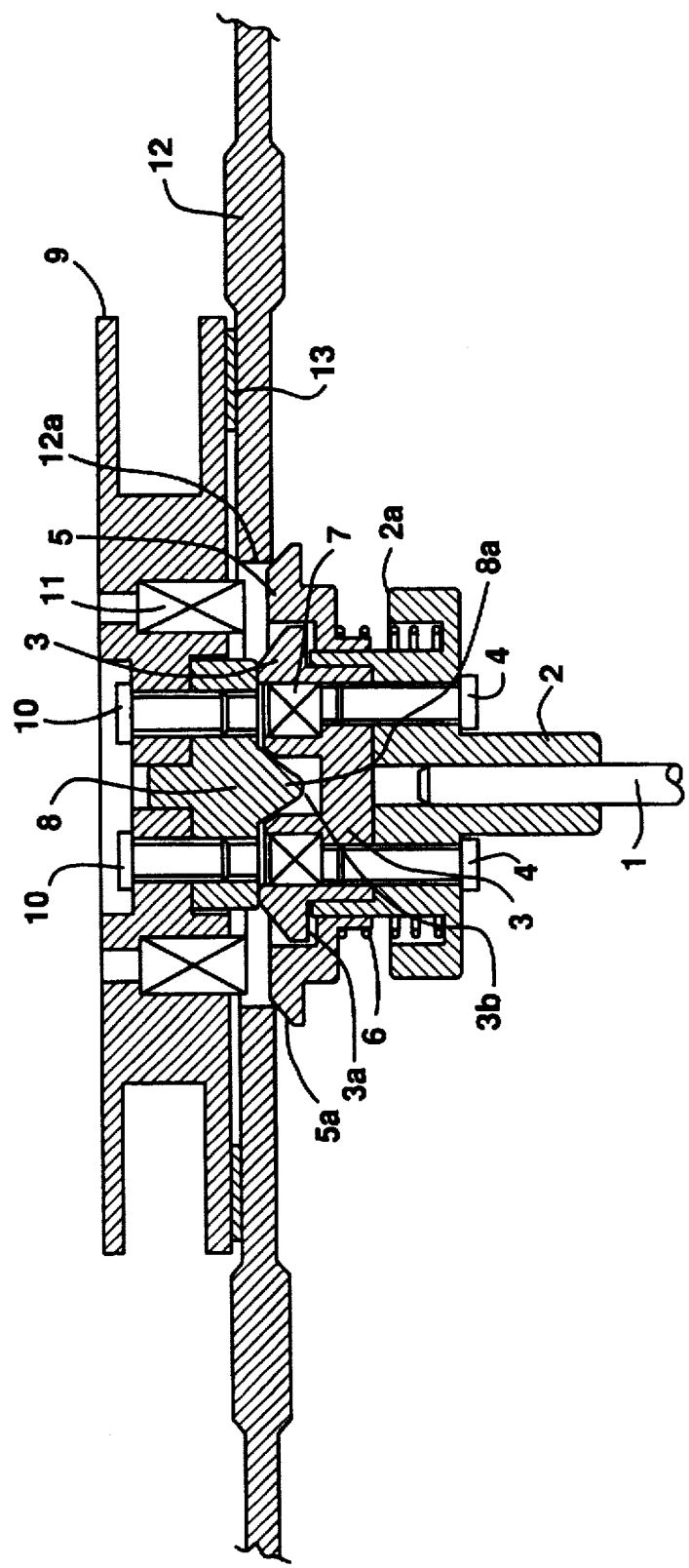
FIG. 9 is a cross sectional view showing a CD loaded on and held by the optical disk holding apparatus after the clamper is lowered.

A compact disk and a mini disk are held as shown in FIGS. 9 and 11. A difference between the height at the lower surface of the friction member 13 shown in FIG. 9 and the height at the upper surface of the movable unit 5 shown in FIG. 11 is set to be equal to a sum of a height difference between the surface of the compact disk contacting the friction member 13 and the record surface and a height difference between the mini disk flange plane and the record surface. Therefore, the record surfaces of both the compact disk and the mini disk held by the holding apparatus are at the same height so that both disks can be reproduced without chanting the height of an optical pickup.

Figure 12A:
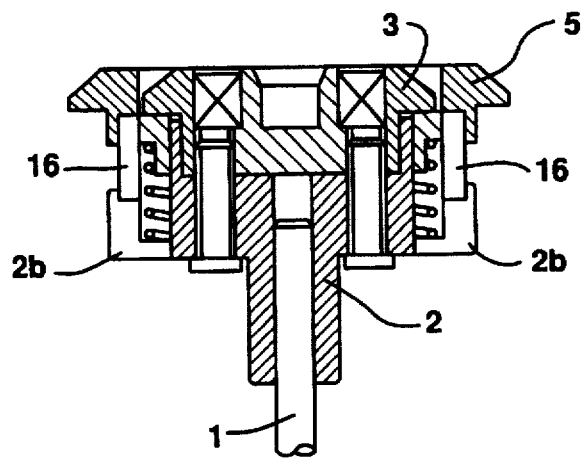
FIG. 12(a) is a cross sectional view showing a modification of the optical disk holding apparatus.
Figure 12B:
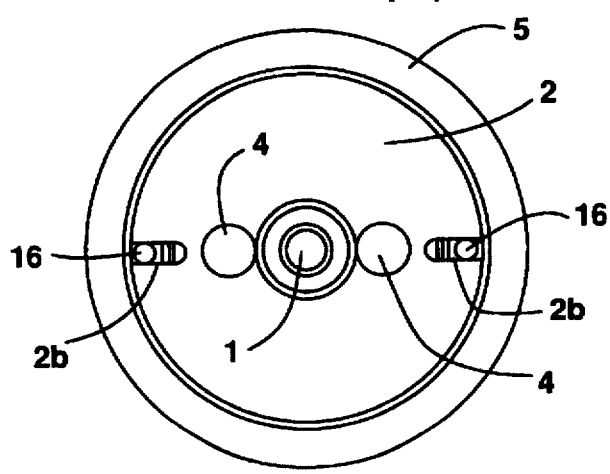
FIG. 12(b) is a plan view of the modification.

FIG. 12 shows a modification of the embodiment described above. In this modification, rotation-stop pins 16 are mounted on the movable unit 5, the rotation-stop pins being engaged with grooves 2b formed in the lower fixed unit 2. With this arrangement, a rotation force can be reliably transmitted from the lower fixed unit 2 to the movable unit 5 without relying upon a friction force.

Figure 13:
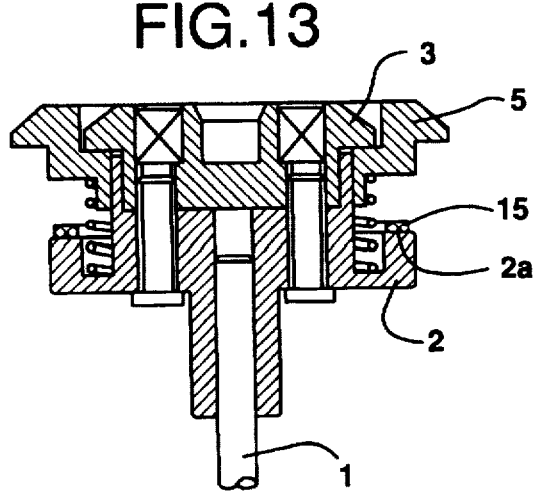
FIG. 13 is a cross sectional view showing a modification of the optical disk holding apparatus.

FIG. 13 shows another modification. In this modification, a friction member 15 having a large friction coefficient is attached to the press contact plane 2a of the lower fixed unit 2. With this arrangement, a larger rotation force can be transmitted from the lower fixed unit 2 to the movable unit 5. The friction member may be attached to the movable unit 5. One of or both the contact surfaces of the lower fixed unit 2 and movable unit 5 may be made rough to provide a large friction coefficient.

Figure 14:
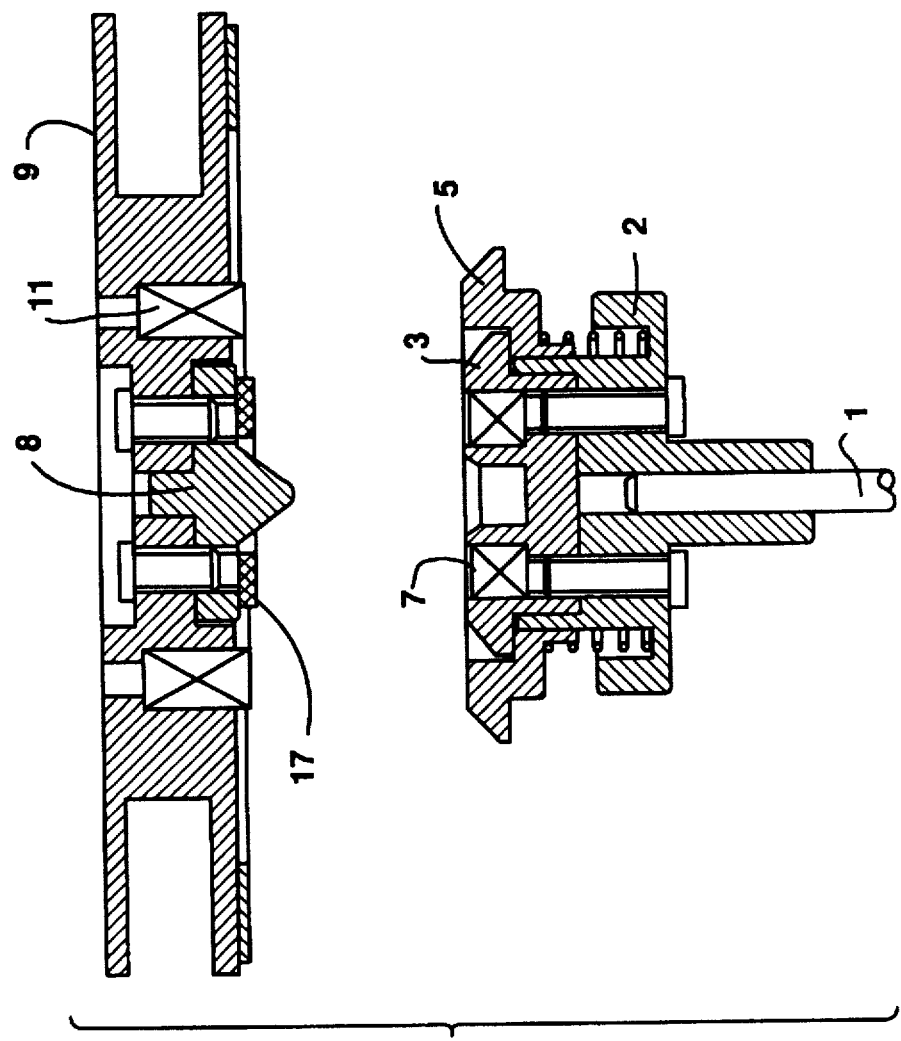
FIG. 14 is a cross sectional view showing another modification of the optical disk holding apparatus.

FIG. 14 shows a further modification. In this modification, a friction member 17 having a large friction coefficient is attached to the lower surface of the attaching unit 8 of the clamper. With this arrangement, a larger rotation force can be transmitted from the lower fixed unit 2 to the clamper. The friction member may be attached to the lower fixed unit 2. One of or both the contact surfaces of the lower fixed unit 2 and attaching unit 8 may be made rough to provide a large friction coefficient.

The invention is not limited to the above embodiments. For example, a magnet may be used as the attaching unit 8 of the clamper so as to be attracted by the magnet 7 of the upper fixed unit 3. The magnet may be used as the magnet 11 for attracting the movable unit.

The movable unit 5 may push the contact disk 12 against the friction member 13 by either an elastic force of the compression coil spring 6 or an attraction force of the magnet 11.

The lower fixed unit 2 and upper fixed unit 3 may be integrally formed by resin, with the movable unit 5 being mounted thereon. The clamper main body 9 and the friction member 13 may be integrally formed by resin, and the attaching unit 8 and magnet 11 may be integrally formed by insert molding.

Embodiments of Second Optical Disk Holding Apparatus

Figure 15:
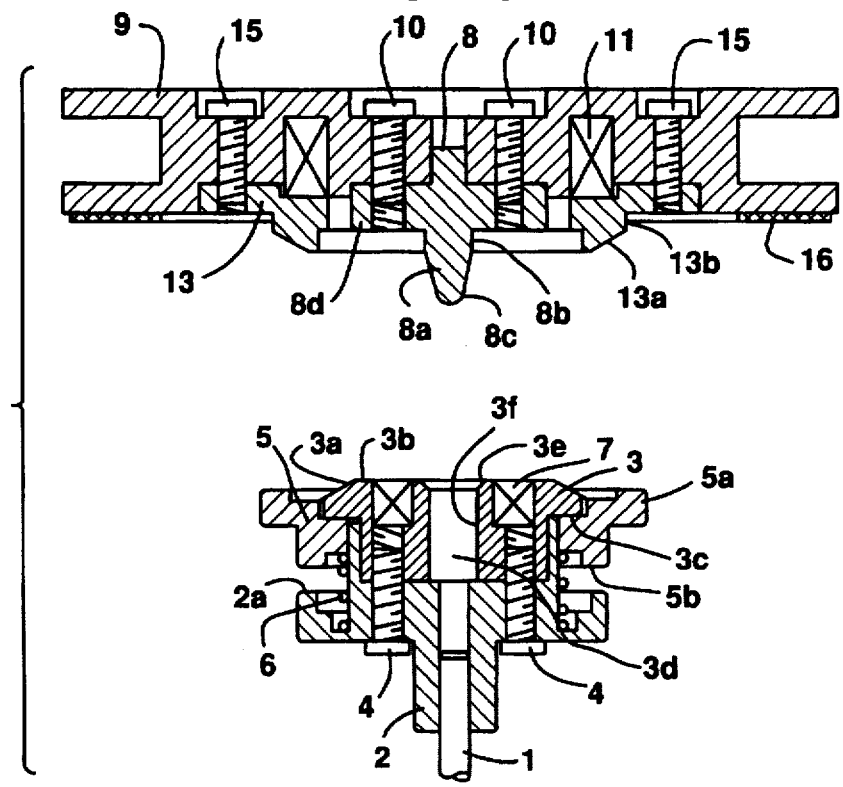
FIG. 15 is a cross sectional view of an optical disk holding apparatus according to another embodiment of the invention.

The embodiments of the invention will be described with reference to the accompanying drawings. FIG. 15 is a cross sectional view of a first embodiment of a second optical disk holding apparatus according to the present invention. In FIG. 15, reference numeral 1 represents a rotary shaft of a disk motor fixed to a chassis. The rotary shaft 1 is press-fitted in a hole formed in a lower fixed unit 2, and the rotary shaft 1 and lower fixed unit 2 are formed in one unit.

A compression coil spring 6 is disposed around the periphery of the lower fixed unit 2. A movable unit 5 is placed on one end of the sprint 6 and loosely engaged with the lower fixed unit 2. Under this condition, an upper fixed unit 3 is fixedly coupled to the lower fixed unit 2 by screws 4. The movable unit 5 is movable between an outer peripheral lower plane 3c of the upper fixed unit 3 and a pressure contact plane 2a of the lower fixed unit 2. The movable unit 5 is normally pressed against the outer peripheral lower plane 3c of the upper fixed unit 3 by the force of the compression coil spring 6 as shown in FIG. 15.

The upper surface 5a and lower surface 5b of the movable unit 5 are perpendicular to the disk motor rotary shaft 1. A ring magnet 7 is embedded in the upper fixed unit 3 at its upper area, and a positioning hole 3d is formed in the upper fixed unit at its central area. The hole 3d has an upper taper surface 3e and a lower cylindrical surface 3f. The upper periphery of the upper fixed unit 3 is formed with a taper plane 3a. The upper surface of the upper fixed unit 3 is perpendicular to the disk motor rotary shaft 1.

FIG. 3 shows an outer appearance of an assembly state of the lower fixed unit 2, movable unit 5, and upper fixed unit 3. FIG. 3(a) shows a state where the movable unit 5 is at its upper limit, and FIG. 3(b) shows a state where the movable unit 5 is at its lower limit.

A clamper is constituted by a clamper main body 9, an attaching unit 8 fixed to the main body 9 by screws, and a disk positioning unit fixed to the main body 9 by screws 15. The clamper is driven by a drive mechanism (not shown) and moved between the position shown in FIG. 15 and the position where a projection 8a of the attaching unit 8 is fitted in the hole 3d of the upper fixed member 3 when the attaching unit 8 is attracted by the magnet 7.

Figure 16A:
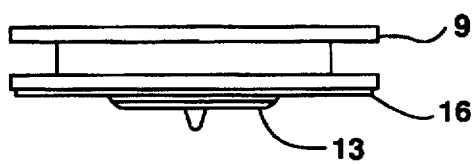
FIG. 16(a) is a front view of a clamper of the optical disk holding apparatus.
Figure 16B:
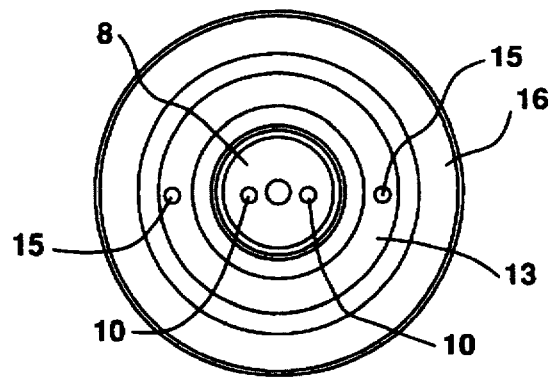
FIG. 16(b) is a bottom view of the clamper.

A ring magnet 11 for attracting the movable unit 5 over the disk positional unit 13 is embedded in the clamper main body 9 at its lower area. To the outer circumferential area of the clamper main body 9, a friction member 13 is attached for imparting a rotation force to a compact disk by tightly contacting the disk. The disk positioning unit 13 is formed with an engaging step 13b for smoothly engaging with a hole of a compact disk, and with a taper guide surface 13a for guiding the compact disk toward the engaging step 13b. FIG. 16 shows an outer appearance of the clamper. FIGS. 4 and 5 show a compact disk (CD) held by the optical disk holding apparatus. A center hole 12a is formed in a compact disk 12 at the center thereof.

FIGS. 6 and 7 show a mini disk (MD) held by the optical disk holding apparatus. A mini disk 14a is housed in a cartridge 14. The cartridge 14 has a hole 14e by which the mini disk 14a is held by the holding apparatus and a shutter used for passing a laser beam from an optical pickup and for pressing a magnetic head against the mini disk 14a.

At the central area of the mini disk, there are formed a center hole 14c for positioning the mini disk in the radial direction, and a flange 14d for positioning the mini disk in the height direction. A metal plate 14b for shielding the upper opening of the center hole 14c is also embedded at the central area of the mini disk.

Next, with reference to FIGS. 17 and 18, how a compact disk is held by the holding apparatus will be described. First, the clamper main body 9 is maintained at the position shown in FIG. 17 just above the upper fixed unit 3, by the clamper drive mechanism.

Under this condition, the compact disk 12 is transported to the position above the upper fixed unit 3 by a loading mechanism, and thereafter it is lowered to the upper fixed unit 3 so that the center hole 12a of the compact disk 12 positions generally concentrically with the movable unit 5. Because the elastic force of the compression coil spring 6 is set greater than the force of gravity of the movable unit 5 and compact disk 12, the movable unit 5 maintains pressed against the upper fixed unit 3.

Next, the clamper main body 9 is lowered by the clamper drive mechanism. As shown in FIG. 18, the attaching unit 8 is attracted by the magnet 7 so that the projection 8a enters the hole 3d and the clamper is positioned coaxially with the disk motor rotary shaft 1. A cylindrical portion 8b of the projection 8a and the cylindrical surface 3f of the hole 3d engage each other so that a tilt of the clamper is restricted.

Although the compact disk 12 placed on the upper surface 5a of the movable unit 5 is pushed down by the clamper, the movable unit 5 is biased upward by the compression coil spring 6 and attracted by the magnet 11 so that the compact disc 12 is pushed upward and guided by the guide surface 13a of the disk positioning unit 13. As a result, the center hole 12a engages with the engaging step 13b of the disk positioning unit 13, and the compact disk 12 is pushed against the friction member 16 of the clamper.

In the above manner, the compact disk 12 is positioned vertically and coaxially with the disk motor rotary shaft 1.

The rotation force of the disk motor is transmitted to the compact disk with the help of the friction force between the upper surface 3b of the upper fixed unit 3 and the lower surface 8d of the attaching unit 8 and the friction force between the friction member 16 and the compact disk 12.

Next, with reference to FIGS. 19 and 20, how a mini disk is held by the holding apparatus will be described. In this case, the clamper main body 9 is maintained at the upper position and is not shown in FIGS. 19 and 20.

The cartridge 14 housing the mini disk 14a is transported to the position above the upper fixed unit 3 by the loading mechanism as shown in FIG. 19, and thereafter it is lowered and placed on the upper fixed unit 3 as shown in FIG. 20.

At this time, the metal plate 14b of the mini disk 14a is attracted by the magnet 7. The center hole 14c of the mini disk 14a is guided by the taper surface 3a of the upper fixed unit 3 and fitted around its peripheral cylindrical surface. In this manner the mini disk 14a is positioned coaxially with the disk motor rotary shaft 1.

The flange 14d of the mini disk 14a pushes the movable unit 5 down to its lower limit against the elastic force of the compression coil spring 6. Under this condition, the press contact plane 2a of the lower fixed unit 2 is pressed against the lower surface 5b of the movable unit 5, and the upper surface 5a of the movable unit 5 is pressed against the flange 14d of the mini disk 14a. As a result, the position of the mini disk 14a in the height direction is fixed, and the surface of the mini disk 14a is fixed perpendicular to the central axis of the disk motor rotary shaft 1.

In this manner, the mini disk is held in position, and the rotation force of the disk motor is transmitted to the mini disk 14a with the help of the friction force between the tight contact plane 2a of the lower fixed unit 2 and the lower surface 5b of the movable unit 5 and the friction force between the upper surface 5a of the movable unit 5 and the flange 14d of the mini disk.

Figure 18:
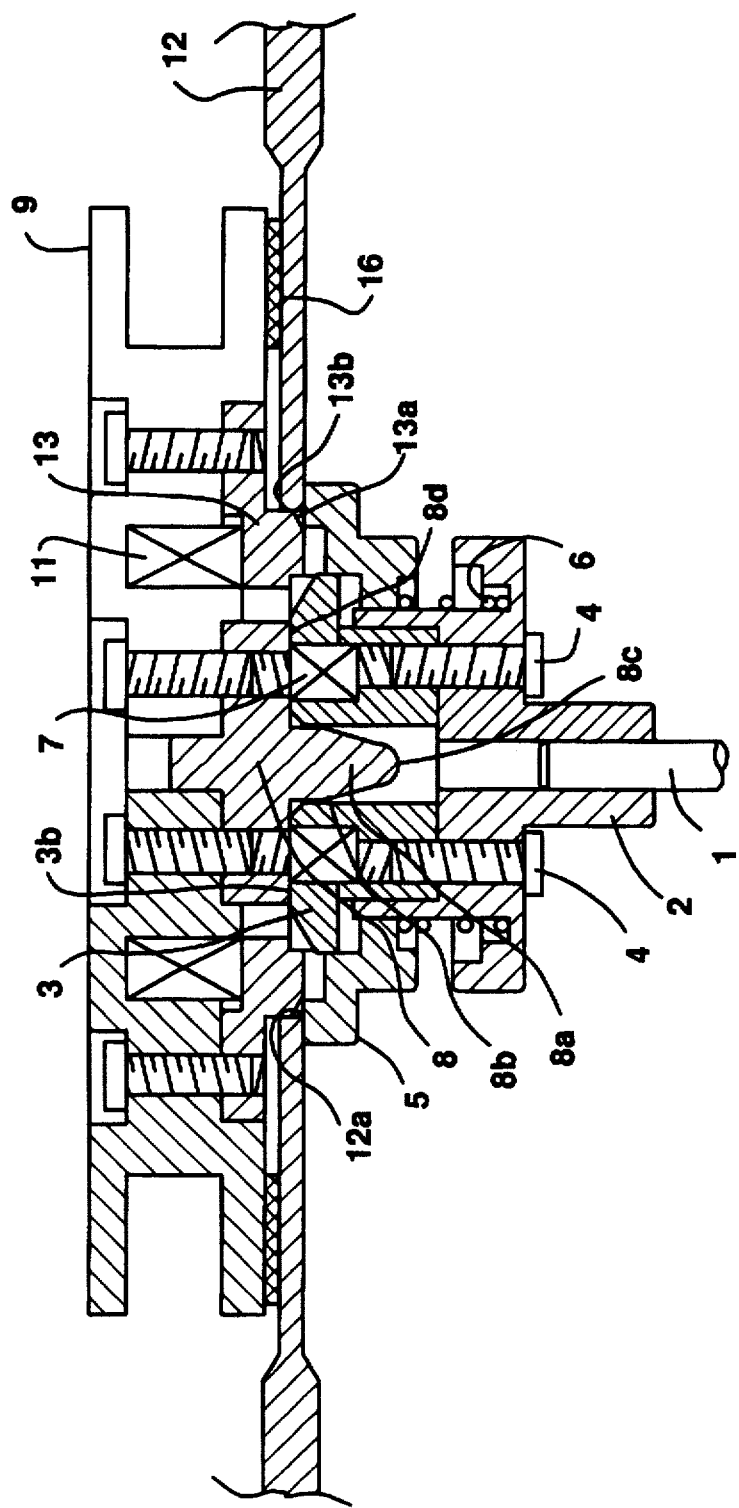
FIG. 18 is a cross sectional view showing a CD loaded on and held by the optical disk holding apparatus after the clamper is lowered.

A compact disk and a mini disk are held as shown in FIGS. 18 and 20. A difference between the height at the lower surface of the friction member 16 shown in FIG. 18 and the height at the upper surface 5a of the movable unit 5 shown in FIG. 18 is set to be equal to a sum of a height difference between the surface of the compact disk contacting the friction member 16 and the record surface and a height difference between the mini disk flange plane and the record surface. Therefore, the record surfaces of both the compact disk and the mini disk held by the holding apparatus are at the same height so that both disks can be reproduced without chanting the height of an optical pickup.

Figure 21A:
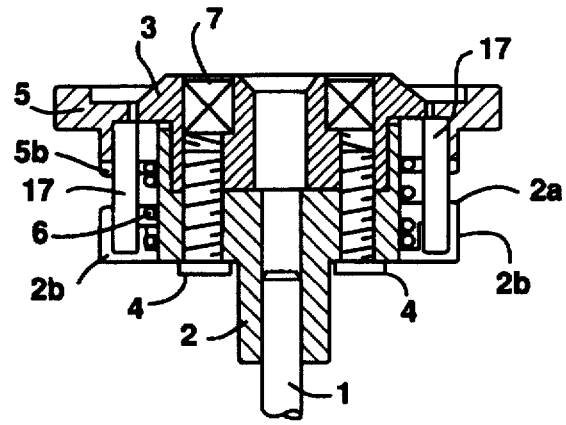
FIG. 21(a) is a cross sectional view showing a modification of the optical disk holding apparatus in which a movable unit is at an upper limit position.
Figure 21B:
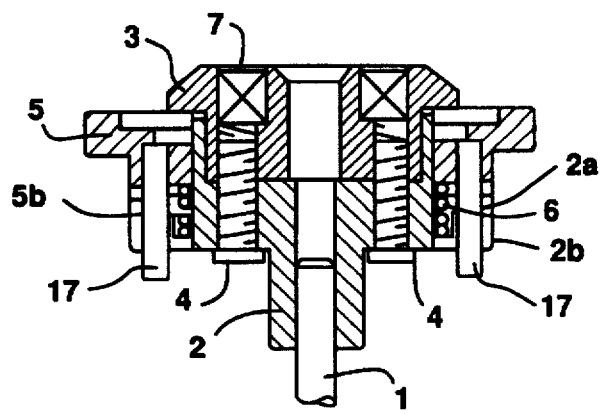
FIG. 21(b) is a cross sectional view with the movable unit being at a lower limit position.
Figure 21C:
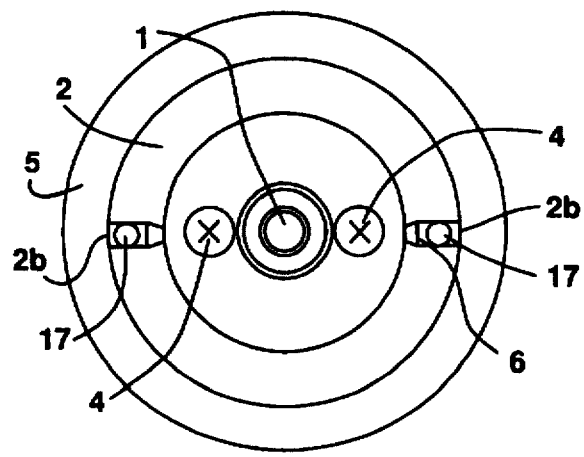
FIG. 21(c) is a plan view of the modification.

FIG. 21 shows a modification of the embodiment described above. In this modification, rotation-stop pins 17 are mounted on the movable unit 5, the rotation-stop pins being engaged with grooves 2b formed in the lower fixed unit 2. With this arrangement, a rotation force can be reliably transmitted from the lower fixed unit 2 to the movable unit 5 without relying upon a friction force.

Figure 22A:
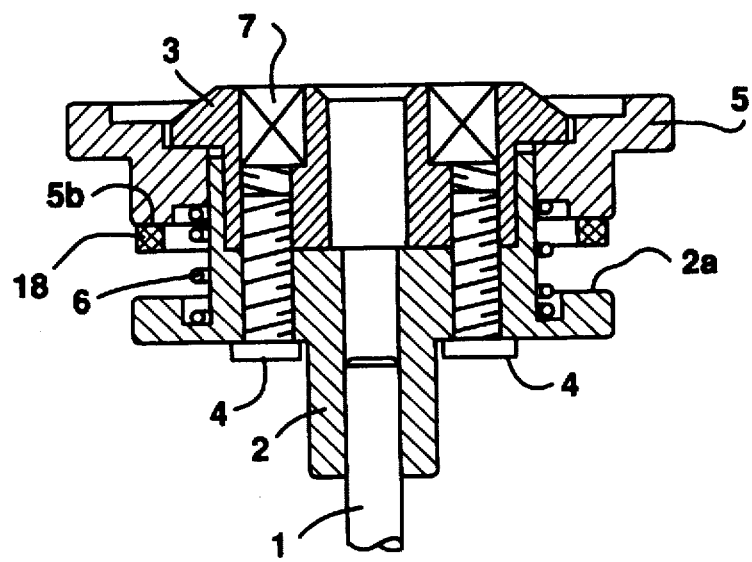
FIG. 22(a) is a cross sectional view showing another modification of the optical disk holding apparatus in which a movable unit is at an upper limit position.
Figure 22B:
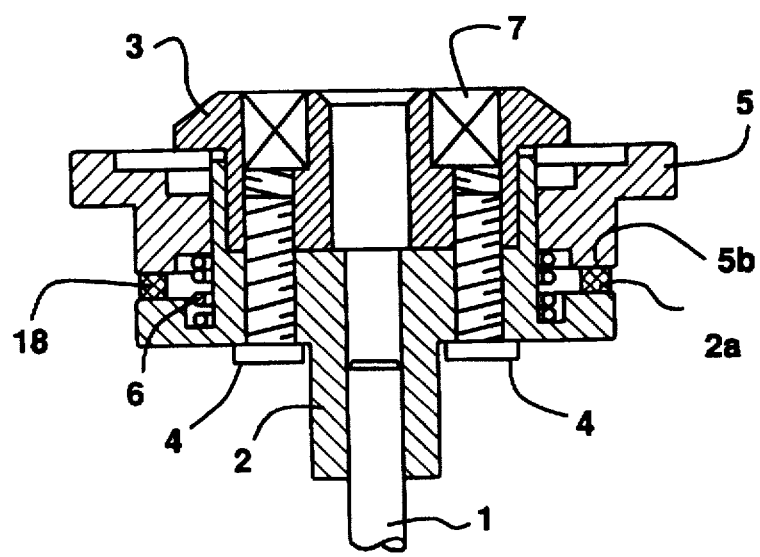
FIG. 22(b) is a cross sectional view with the movable unit being at a lower limit position.

FIG. 22 shows another modification. In this modification, a friction member 18 having a large friction coefficient is attached to the lower surface 5b of the movable unit 5. With this arrangement, a larger rotation force can be transmitted from the lower fixed unit 2 to the movable unit 5. The friction member may be attached to the lower fixed unit 2. One of or both the contact surfaces of the lower fixed unit 2 and movable unit 5 may be made rough to provide a large friction coefficient.

Figure 23A:
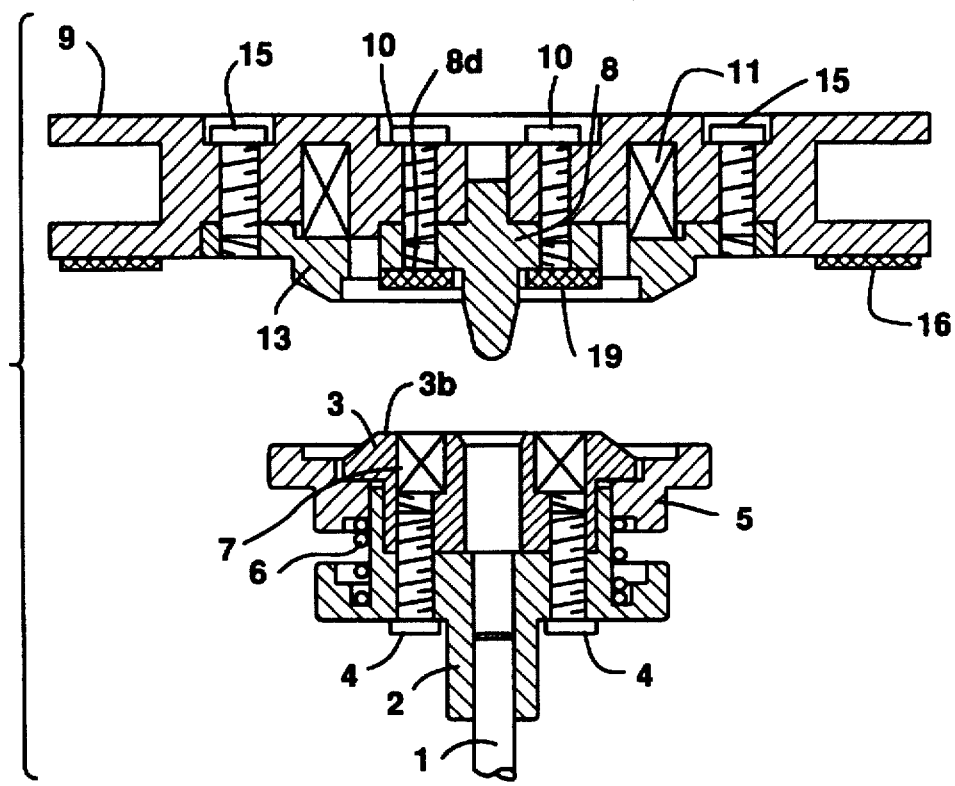
FIG. 23(a) is a cross sectional view showing a further modification of the optical disk holding apparatus in which a clamper main body is above the upper fixed unit.
Figure 23B:
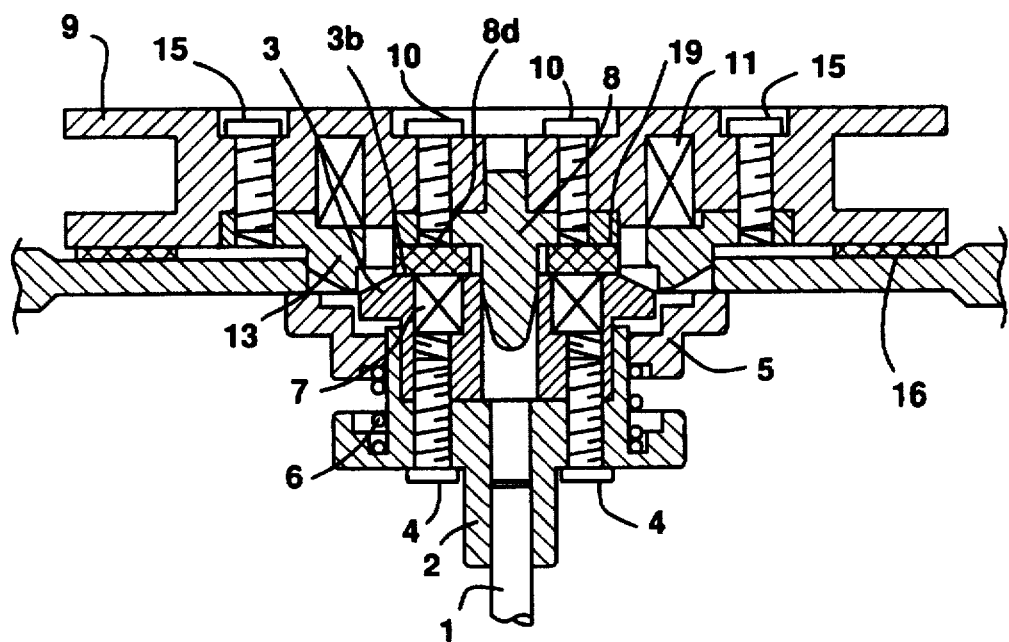
FIG. 23(b) is a cross sectional view showing an attaching unit of the clamper tightly attached to the upper fixed unit.

FIG. 23 shows a further modification. In this modification, a friction member 19 having a large friction coefficient is attached to the lower surface 8d of the attaching unit 8 of the clamper. With this arrangement, a larger rotation force can be transmitted from the upper fixed unit 2 to the clamper. The friction member may be attached to the upper fixed unit 3. One of or both the contact surfaces of the upper fixed unit 3 and attaching unit 8 may be made rough to provide a large friction coefficient.

Figure 24A:
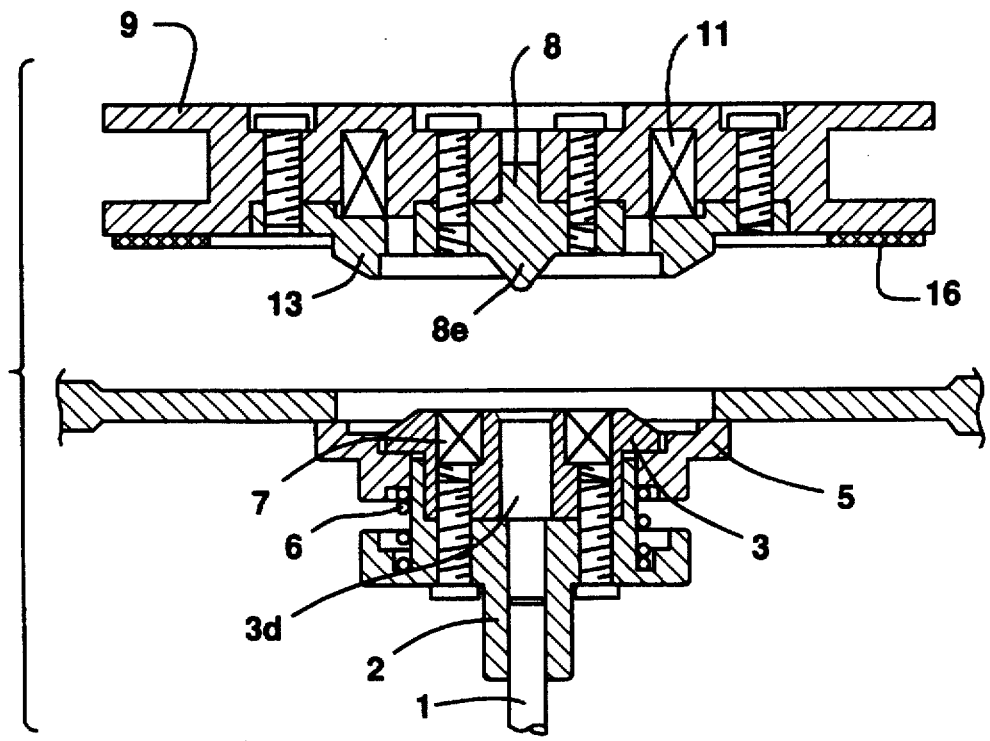
FIG. 24(a) is a cross sectional view showing a still further modification of the optical disk holding apparatus in which a clamper main body is above the upper fixed unit.
Figure 24B:
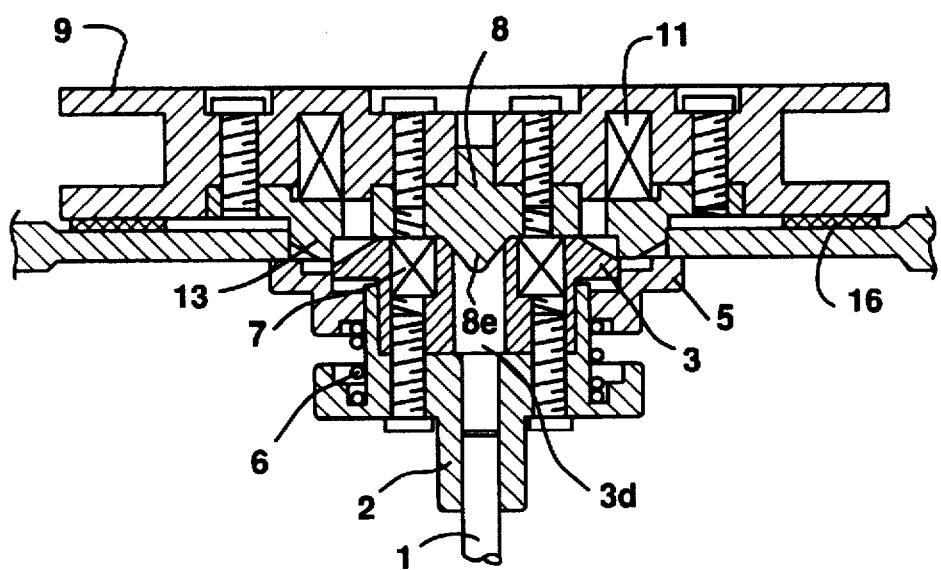
FIG. 24(b) is a cross sectional view showing an attaching unit of the clamper tightly attached to the upper fixed unit.

FIG. 24 shows a still further modification. In this modification, the projection of the attaching unit 8 of the clamper has only a taper portion 8e. With this arrangement, the clamper can be made thin. Only the taper portion can sufficiently align the positions in an ordinary case.

Figure 25:
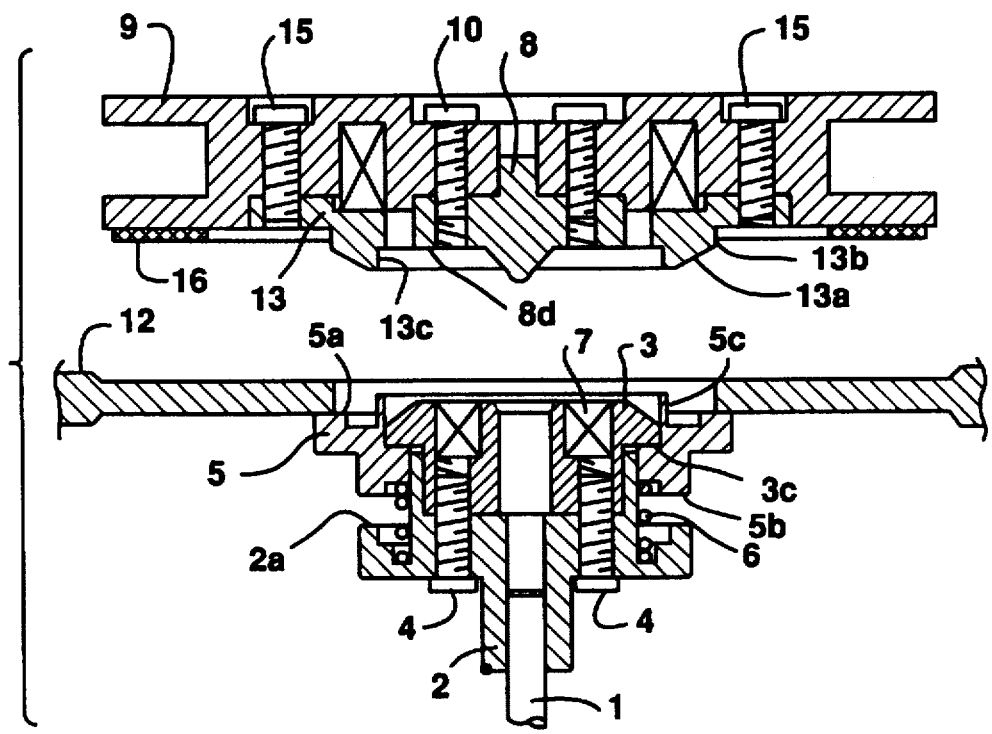
FIG. 25 is a cross sectional view showing a CD loaded on an optical disk holding apparatus of another embodiment before the clamper is lowered.

FIG. 25 is a cross sectional view showing a second embodiment of the second optical disk holding apparatus. In this embodiment, a male cylinder 5c mounted on the movable unit 5 engages with a female cylinder 13c of the disk positioning unit 13 and a center hole 14c of a mini disk, with a very small clearance therebetween. The outer periphery of the upper fixed unit 3 is much smaller than the center hole 14c of a mini disk. The other structure is the same as the first embodiment.

Figure 26:
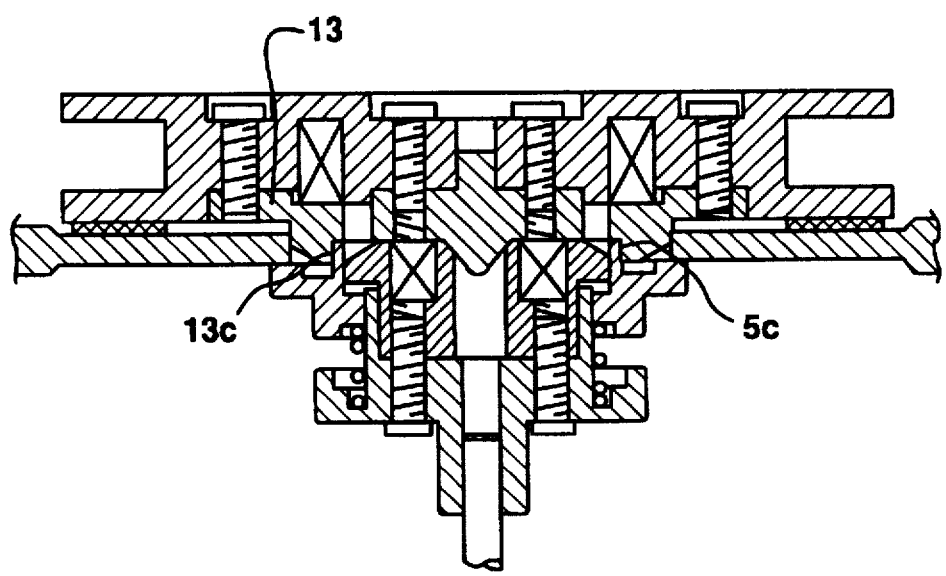
FIG. 26 is a cross sectional view showing a CD loaded on and held by the optical disk holding apparatus after the clamper is lowered.

FIG. 26 shows a compact disk held by the optical disk holding apparatus shown in FIG. 25. An engagement between a female cylinder 13c of the disk positioning unit 13 and a male cylinder 5c determines the position of the clamper.

Figure 27:
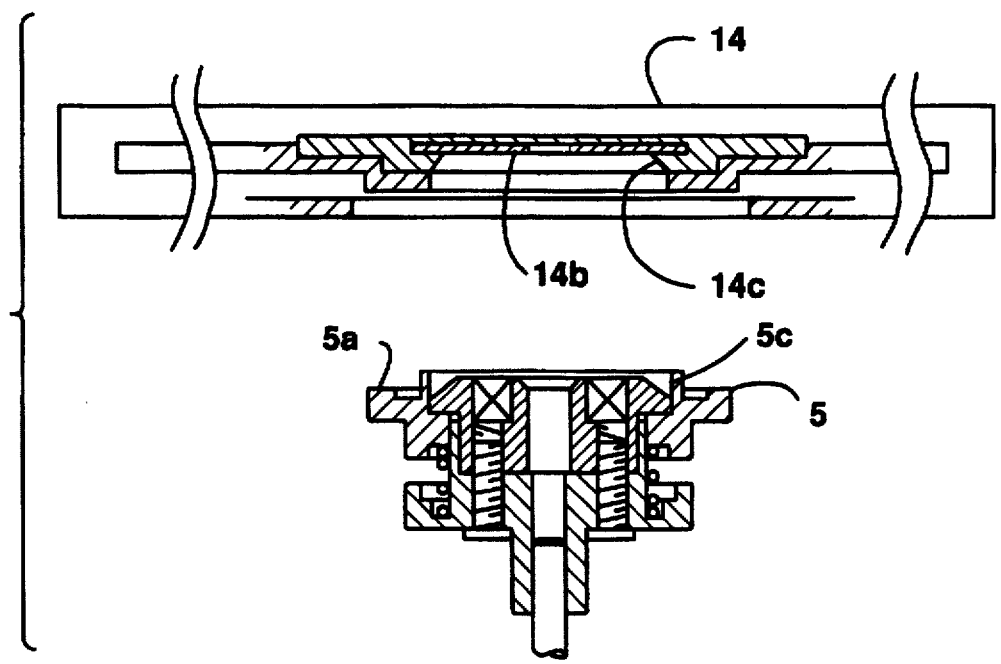
FIG. 27 is a cross sectional view showing an MD loaded above the optical disk holding apparatus.
Figure 28:
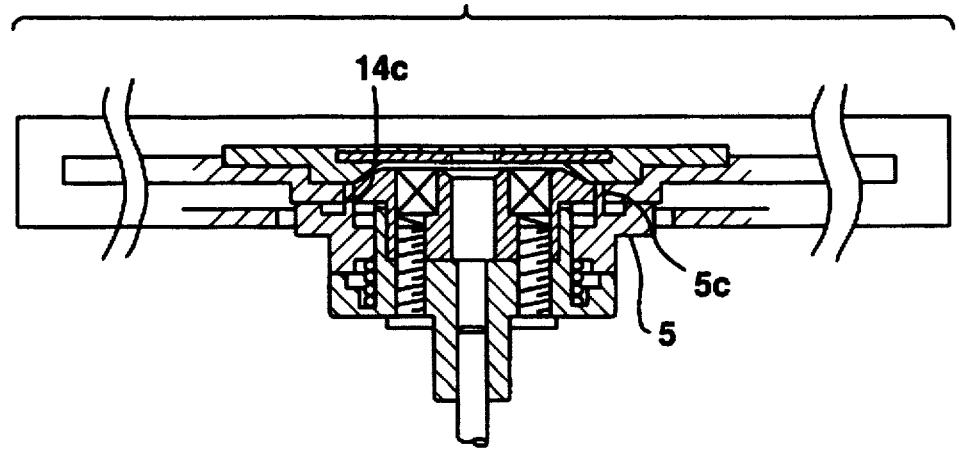
FIG. 28 is a cross sectional view showing an MD lowered from the position shown in FIG. 27 and held by the optical disk holding apparatus.

FIG. 27 is a cross sectional view showing an MD loaded above the optical disk holding apparatus shown in FIG. 25, and FIG. 28 is a cross sectional view showing the MD held by the apparatus. In this embodiment, an engagement of the male cylinder 5c of the movable unit 5 and the center hole 14c of a mini disk determines the position of the mini disk.

The invention is not limited to the above embodiments. For example, the compression coil spring 6 may be omitted if the magnet 11 has a large attraction force. If the magnet 11 has a predetermined attraction force or higher, the movable unit at the lower limit position as well as a compact disk placed thereon can be attracted and the compact disk can be pushed against the friction member 16 of the clamper main body 9.

If the compression coil spring 6 is omitted, the lower surface 5b of the movable unit 5 is strongly pushed against the press contact plane 2a of the lower fixed unit 2 when a mini disk is held. Therefore, a rotation force can be reliably transmitted from the lower fixed unit 2 to the movable unit 5. Conversely, the magnet 11 may be omitted by using a compression coil spring 6 having a large elastic force. The clamper main body 9 may be biased in the direction of pushing the upper fixed unit 3. In this case, the clamper main body 9 becomes stable against an external force such as vibrations. Such a bias of the clamper main body 9 may be achieved by pushing a ball-shaped member mounted on the central upper surface of the clamper main body 9 by an elastic member mounted on a clamper lifting unit.

A magnet may be used as the attaching unit 8 of the clamper so as to be attracted by the magnet 7 of the upper fixed unit 3. This magnet may be used as the magnet 11 for attracting the movable unit.

The magnet 11 of the clamper main body 9 and the disk positioning unit 13 may be formed by the same magnet.

The disk positioning unit 13 and attaching unit 8 may be molded integrally, and the polarity of the magnet attached to the disk positioning unit 13 may be set to attract the magnet 7 of the upper fixed unit 3.

The clamper main body 9 and the friction member 13 may be integrally formed by resin, and the attaching unit 8 and magnet 11 may be integrally formed by insert molding.

According to the optical disk holding apparatus of this invention, the record surfaces of a compact disc and a mini disk can be made equal, and both the disks can be rotated by the same disk motor rotary shaft. A reproducing apparatus can be realized at a low manufacturing cost which can reproduce data from both the disks without changing the height of an optical pickup.

What is claimed is:

1. An optical disk holding apparatus for holding either type optical disks such as a compact disk or a mini disk so that information is read from or written to such optical disk, said compact disk having a center hole, said mini disk being housed within a cartridge and having a metal plate at its center, said apparatus comprising:

a fixed unit fixed to a rotary shaft of a disk motor;

a movable unit being guided by said fixed unit, said movable unit having a press contact plane contacting a central flange plane of at least when holding said mini disk;

a clamper having a press contact surface which contacts a first surface of said compact disk, for holding said compact disk between said clamper and said movable unit; and an attracting member mounted in said fixed unit for holding said mini disk, said attracting member operating to attract said metal plate of said mini disk;

wherein a difference between a height at said press contact surface of said clamper when holding said compact disk and a height at said press contact plane of said movable unit when holding said mini disk is set to be equal to a sum of a difference of a height between said first surface and a record surface of said compact disk and a difference of a height between said central flange plane and a record surface of said mini disk, so that a distance between a pick-up and the record surface of said compact disk becomes equal to a distance between said pick-up and the record surface of said mini disk.

2. The apparatus of claim 1 wherein said clamper further comprises a second attracting member for holding said compact disk, said second attracting member operating to attract said movable unit.

3. The optical disk holding apparatus of claim 2 wherein said movable unit has a tapered surface contacting a periphery of said center hole of said compact disk.

4. The optical disk holding apparatus of claim 3, wherein said tapered surface of said movable unit is held in contact with said periphery of said center hole by a spring at least when holding said compact disk, and said press contact plane is held in contact with said central flange plane of said mini disk by said spring at least when holding said, mini disk.

5. The optical disk holding apparatus of claim 4, wherein said tapered surface of said movable unit is further held in contact with said periphery of said center hole by an attraction force of said second attracting member.

6. The optical disk holding apparatus of claim 3, wherein said tapered surface of said movable unit is held in contact with said periphery of said center hole by an attraction force of said second attracting member.

7. The optical disk holding apparatus of claim 1, wherein:

said fixed unit comprises an upper portion having a positioning hole and a lower portion connected to said upper portion;

said movable unit moves between said upper portion of said fixed unit and said lower portion of said fixed unit; and said clamper has a projection, said projection being received in said positioning hole for aligning said optical disk of said first type with said fixed unit and said movable unit.

8. The optical disk holding apparatus of claim 1, wherein said press contact surface has a high friction coefficient.

9. The optical disk holding apparatus of claim 1, wherein a rotation-stop member for preventing said movable unit from rotating around said fixed unit is provided between movable unit and said fixed unit.

10. An optical disk holding apparatus for holding either type optical disks such as a compact disk or a mini disk so that information is read from or written to such optical disk, said compact disk having a center hole, said mini disk being housed within a cartridge and having a metal plate at its center, said apparatus comprising:

a fixed unit fixed to a rotary shaft of a disk motor;

a movable unit being guided by said fixed unit and biased by a spring in a first direction, said movable unit having a press contact plane contacting a central flange plane of said mini disk at least when holding said mini disk;

clamper means having a press contact surface, which contacts a first surface of said compact disk, for holding said compact disk between said clamper means and said movable unit, said clamper means comprising projection means for aligning said compact disk with said fixed unit and said movable unit;

first attracting means mounted in said fixed unit for holding said mini disk, said first attracting means operating to attract said metal plate of said mini disk; and second attracting means mounted in said clamper means for holding said compact disk, said second attracting means operating to attract said movable unit;

wherein a difference between a height at said press contact surface of said clamper means when holding said compact disk and a height at said press contact plane of said movable unit when holding said mini disk is set to be equal to a sum of a difference of a height between said first surface and a record surface of said compact disk and a difference of a height between said central flange plane and a record surface of said mini disk, so that a distance between a pick-up and the record surface of said compact disk becomes equal to a distance between said pick-up and the record surface of said mini disk.

* * * * *